(12) United States Patent
Imoto et al.

(10) Patent No.: US 10,931,485 B2
(45) Date of Patent: Feb. 23, 2021

(54) ADAPTIVE EQUALIZATION CIRCUIT AND OPTICAL RECEIVER

(71) Applicant: FUJITSU LIMITED, Kawasaki (JP)

(72) Inventors: Yuya Imoto, Kawasaki (JP); Kazuhiko Hatae, Kawasaki (JP); Nobukazu Koizumi, Kawasaki (JP); Yasuo Ohtomo, Yokohama (JP); Masashi Sato, Kawasaki (JP); Daisuke Sasaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/733,282

(22) Filed: Jan. 3, 2020

(65) Prior Publication Data
US 2020/0267030 A1    Aug. 20, 2020

(30) Foreign Application Priority Data
Feb. 15, 2019 (JP) .............................. JP2019-025985

(51) Int. Cl.
*H04L 25/03* (2006.01)
*H04L 25/02* (2006.01)

(52) U.S. Cl.
CPC .... *H04L 25/03063* (2013.01); *H04L 25/0224* (2013.01); *H04L 2025/03681* (2013.01)

(58) Field of Classification Search
CPC ........... H04L 25/03063; H04L 25/0307; H04L 25/03076; H04L 25/03019; H04L 25/03
See application file for complete search history.

(56) References Cited

U.S. PATENT DOCUMENTS

| | | | |
|---|---|---|---|
| 5,491,446 A | 2/1996 | Okada et al. | |
| 2014/0301743 A1* | 10/2014 | Nakashima | H04B 10/697 398/209 |
| 2015/0161980 A1* | 6/2015 | Alderson | G10K 11/17885 381/71.11 |
| 2020/0014469 A1* | 1/2020 | Shibahara | H04B 10/2581 |
| 2020/0041269 A1* | 2/2020 | Strandjord | H03D 7/165 |

FOREIGN PATENT DOCUMENTS

| | | |
|---|---|---|
| JP | 5-244464 | 9/1993 |
| JP | 6-204801 | 7/1994 |

\* cited by examiner

*Primary Examiner* — Curtis B Odom
(74) *Attorney, Agent, or Firm* — Fujitsu Patent Center

(57) ABSTRACT

An adaptive equalization circuit includes: a first filter configure to perform filtering on an input signal based on a tap coefficient; an applying circuit configured to apply, to the signal, noise outside a band of the signal; and a controller configured to set, for the first filter, the tap coefficient that compensates for transmission line characteristics of the signal, based on the signal to which the noise is applied by the applying circuit.

9 Claims, 27 Drawing Sheets

ADAPTIVE EQUALIZATION CIRCUIT AND OPTICAL RECEIVER

CROSS-REFERENCE TO RELATED APPLICATION

This application is based upon and claims the benefit of priority of the prior Japanese Patent Application No. 2019-25985, filed on Feb. 15, 2019, the entire contents of which are incorporated herein by reference.

FIELD

The embodiment discussed herein is related to an adaptive equalization circuit and an optical receiver.

BACKGROUND

An adaptive equalization circuit adaptively removes waveform distortion generated in a signal.

Japanese Laid-open Patent Publication No. 5-244464 and Japanese Laid-open Patent Publication No. 6-204801 are disclosed as related art.

SUMMARY

According to an aspect of the embodiments, an adaptive equalization circuit includes: a first filter configure to perform filtering on an input signal based on a tap coefficient; an applying circuit configured to apply, to the signal, noise outside a band of the signal; and a controller configured to set, for the first filter, the tap coefficient that compensates for transmission line characteristics of the signal, based on the signal to which the noise is applied by the applying circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, in the adaptive equalization circuit, the waveform distortion generated in the signal is removed by adaptively updating a tap coefficient for a filter in the adaptive equalization circuit. The adaptive equalization circuit is used, for example, in a digital coherent receiver in which coherent reception and digital signal processing are combined, in optical communication.

However, for example, in a case where a digital coherent receiver performs sampling at a frequency that is a non-integer multiple such as 1.33 times a signal sampling frequency, the tap coefficient of the adaptive equalization circuit may fail to converge within the number of taps. Then, the tap coefficient of the adaptive equalization circuit failing to converge within the number of taps poses a problem in that accuracy of compensation for transmission line characteristics by the adaptive equalization circuit decreases.

In one aspect, an adaptive equalization circuit and an optical receiver that allow the tap coefficient to converge within the number of taps may be provided and the accuracy of compensation for transmission line characteristics may be improved.

An embodiment of an adaptive equalization circuit and an optical receiver according to an embodiment will be described below in detail with reference to the drawings.

(Embodiment)

(Adaptive Equalization Circuit According to Embodiment)

Figure 1:
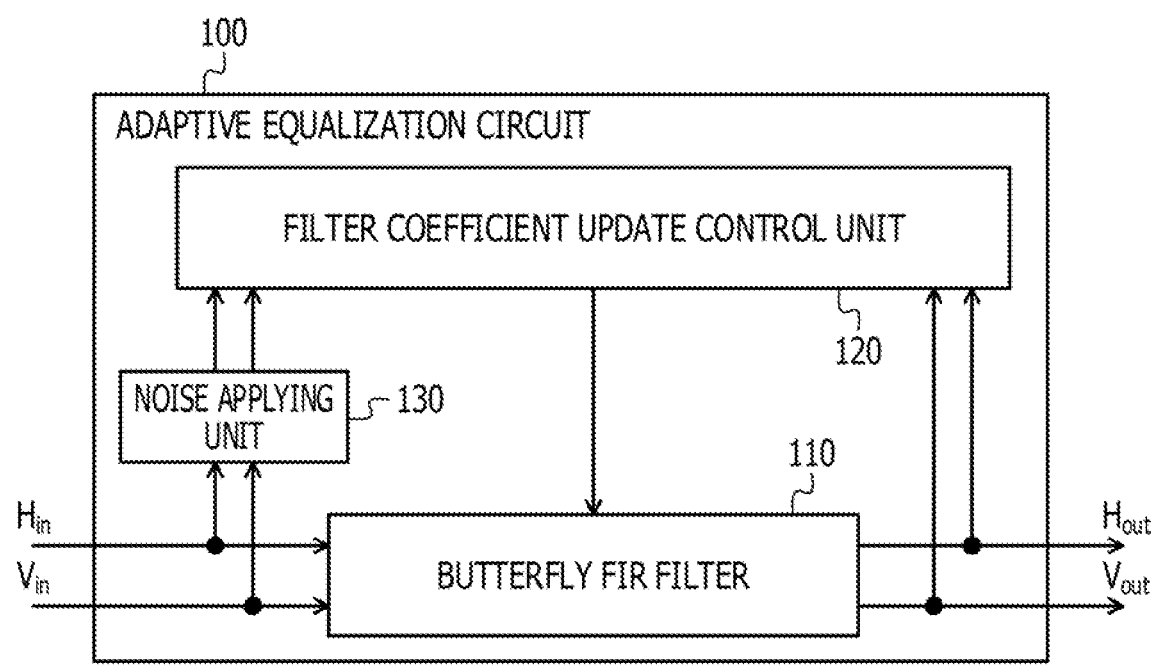
FIG. 1 is a diagram illustrating an example of an adaptive equalization circuit according to an embodiment.

FIG. 1 is a diagram illustrating an example of the adaptive equalization circuit according to the embodiment. As illustrated in FIG. 1, an adaptive equalization circuit 100 according to the embodiment includes a butterfly FIR filter 110, a filter coefficient update control unit 120, and a noise applying unit 130.

The adaptive equalization circuit 100 performs adaptive equalization on input signals. Adaptive equalization is, for example, processing in which distortion of a received signal due to transmission line characteristics is adaptively compensated for in accordance with variation in the transmission line characteristics. The adaptive equalization circuit 100 may be applied to, for example, a digital processing unit of the optical receiver (for example, refer to FIG. 5).

The signals input into the adaptive equalization circuit 100 are, for example, signals obtained by fractional sampling described later. Furthermore, in the example illustrated in FIG. 1, the signals input into the adaptive equalization circuit 100 are, for example, signals $H_{in}$ and $V_{in}$ obtained by coherently receiving polarization-multiplexed signal light. The signal $H_{in}$ is an H-polarization component contained in a received signal at the time of coherent reception. The signal $V_{in}$ is a V-polarization component orthogonal to the H-polarization component contained in the received signal at the time of coherent reception.

The butterfly FIR filter 110 is an example of a filter (first filter) that performs filtering based on a tap coefficient set by the filter coefficient update control unit 120, on the signals $H_{in}$ and $V_{in}$ input into the adaptive equalization circuit 100. The butterfly FIR filter 110 may include, for example, a finite impulse response (FIR) filter having a plurality of taps (for example, refer to FIGS. 7 and 8).

Figure 5:
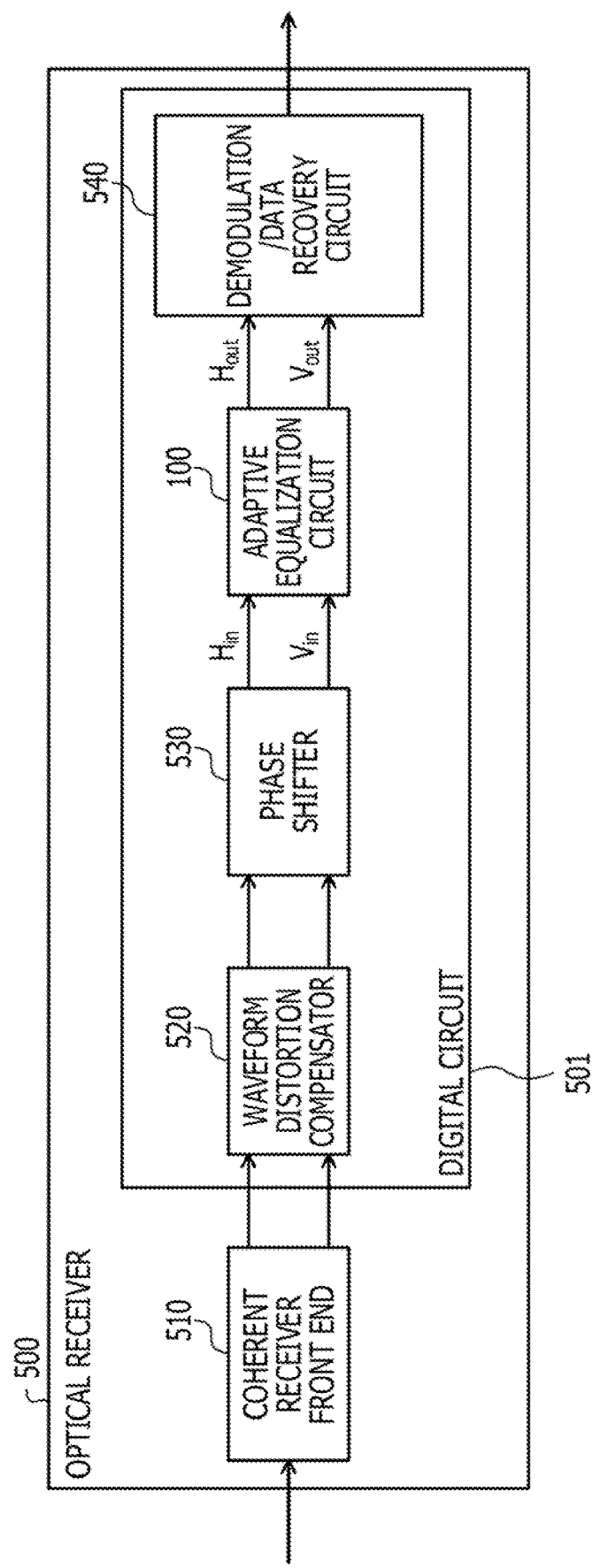
FIG. 5 is a diagram illustrating an example of an optical receiver according to the embodiment.

The butterfly FIR filter 110 outputs signals $H_{out}$ and $V_{out}$ obtained by filtering to a subsequent stage of the butterfly FIR filter 110 (for example, a demodulation/data recovery circuit 540 illustrated in FIG. 5) and the filter coefficient update control unit 120.

On the basis of the signals $H_{in}$, $V_{in}$, $H_{out}$ and $V_{out}$, the filter coefficient update control unit 120 generates a tap coefficient for the butterfly FIR filter 110 for compensating for transmission line characteristics of the signals $H_{out}$ and $V_{out}$. Then, the filter coefficient update control unit 120 sets the generated signals $H_{in}$ and $V_{in}$ for the butterfly FIR filter 110.

The noise applying unit 130 applies noise outside the bands of the signals $H_{in}$ and $V_{in}$ to the signals $H_{in}$ and $V_{in}$ to be input into the filter coefficient update control unit 120. Thus, the filter coefficient update control unit 120 generates a tap coefficient on the basis of the signals $H_{in}$ and $V_{in}$ to which noise has been applied by the noise applying unit 130.

The noise outside the bands of the signals is noise that does not contain frequency components in the frequency bands of the signals but contains frequency components outside the frequency bands of the signals. Alternatively, the noise outside the bands of the signals is noise in which the amplitude of the frequency components outside the frequency bands of the signals is sufficiently larger than the amplitude of the frequency components in the frequency bands of the signals.

Thus, the adaptive equalization circuit 100 controls the tap coefficient for the butterfly FIR filter 110 on the basis of the signals $H_{in}$ and $V_{in}$ to which noise outside the bands of the signals $H_{in}$ and $V_{in}$ has been applied. Consequently, a tap coefficient that attenuates outside the bands of the signals $H_{in}$ and $V_{in}$ may be generated.

Thus, even if the signals $H_{in}$ and $V_{in}$ are signals obtained by fractional sampling, which will be described later, the tap coefficient may be converged within the number of taps of the butterfly FIR filter 110, For this reason, it is possible to improve accuracy of compensation for transmission line characteristics by the butterfly FIR filter 110.

(Transmission Line Characteristics to be Compensated for by Adaptive Equalization Circuit According to Embodiment)

Figure 2:
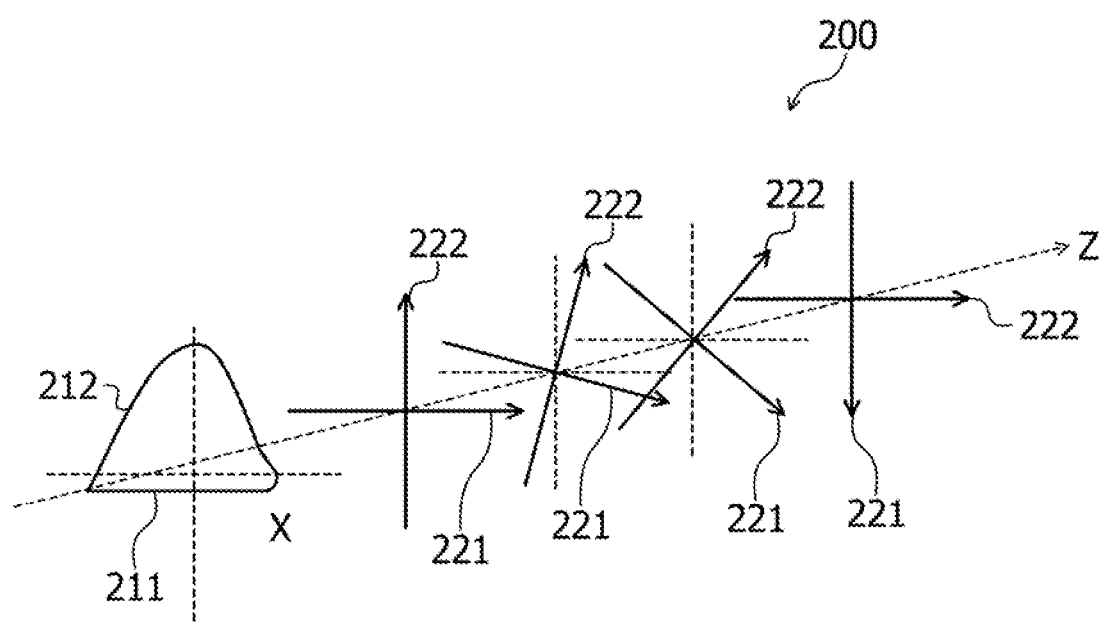
FIG. 2 is a diagram illustrating an example of a transmission line characteristic to be compensated for by the adaptive equalization circuit according to the embodiment.

FIG. 2 is a diagram illustrating an example of a transmission line characteristic to be compensated for by the adaptive equalization circuit according to the embodiment. The adaptive equalization circuit 100 illustrated in FIG. 1 compensates for, for example, polarization rotation 200 illustrated in FIG. 2. The polarization rotation 200 is a phenomenon in which a polarization direction of signal light rotates in a transmission line. A Z-direction illustrated in FIG. 2 indicates a traveling direction of the signal light in the transmission line.

As illustrated in FIG. 2, the signal light to be compensated for by the adaptive equalization circuit 100 contains a mixture of an X-polarization component 211 and a Y-polarization component 212. In the example illustrated in FIG. 2, a polarization direction 221 of the X-polarization component 211 contained in the signal light and a polarization direction 222 of the Y-polarization component 212 contained in the signal light each rotate 90 degrees as the signal light travels along the transmission line in the Z-direction.

Figure 3:
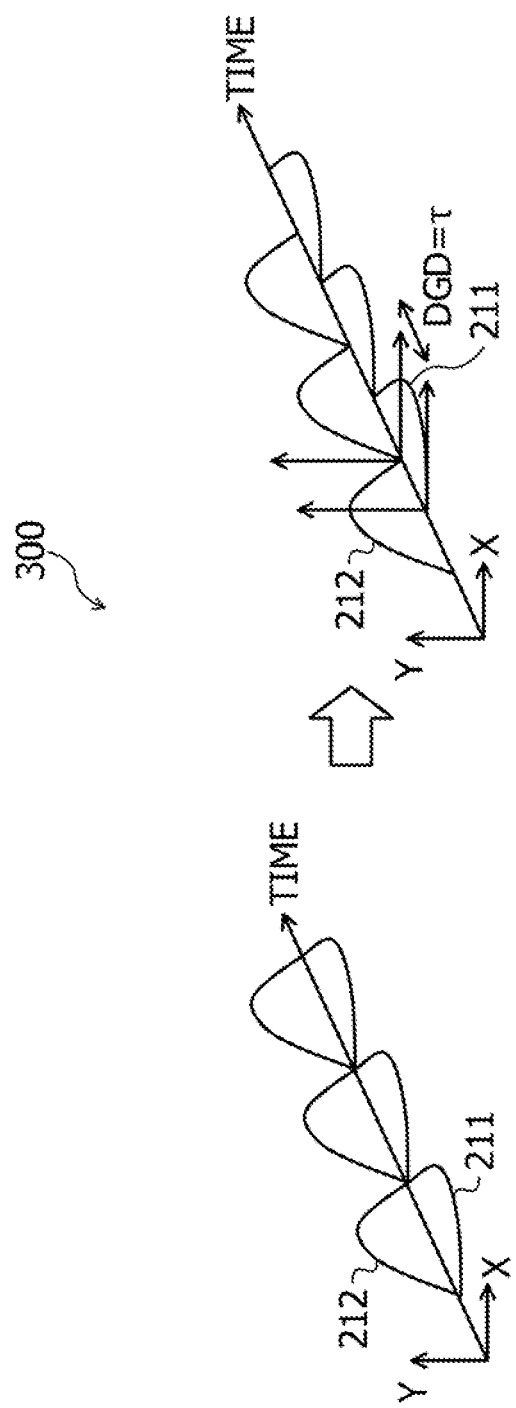
FIG. 3 is a diagram illustrating another example of a transmission line characteristic to be compensated for by the adaptive equalization circuit according to the embodiment.

FIG. 3 is a diagram illustrating another example of a transmission line characteristic to be compensated for by the adaptive equalization circuit according to the embodiment. The adaptive equalization circuit 100 illustrated in FIG. 1 compensates for, for example, a cross-polarization delay difference 300 illustrated in FIG. 3. The cross-polarization delay difference 300 is a differential group delay (DGD) in which a delay difference occurs, in the transmission line, between a polarization direction of the X-polarization component 211 contained in the signal light and a polarization direction of the Y-polarization component 212 contained in the signal light. In the example illustrated in FIG. 3, in the signal light traveling along the transmission line, DGD=T is generated between the X-polarization component 211 and the Y-polarization component 212 contained in the signal light.

Figure 4:
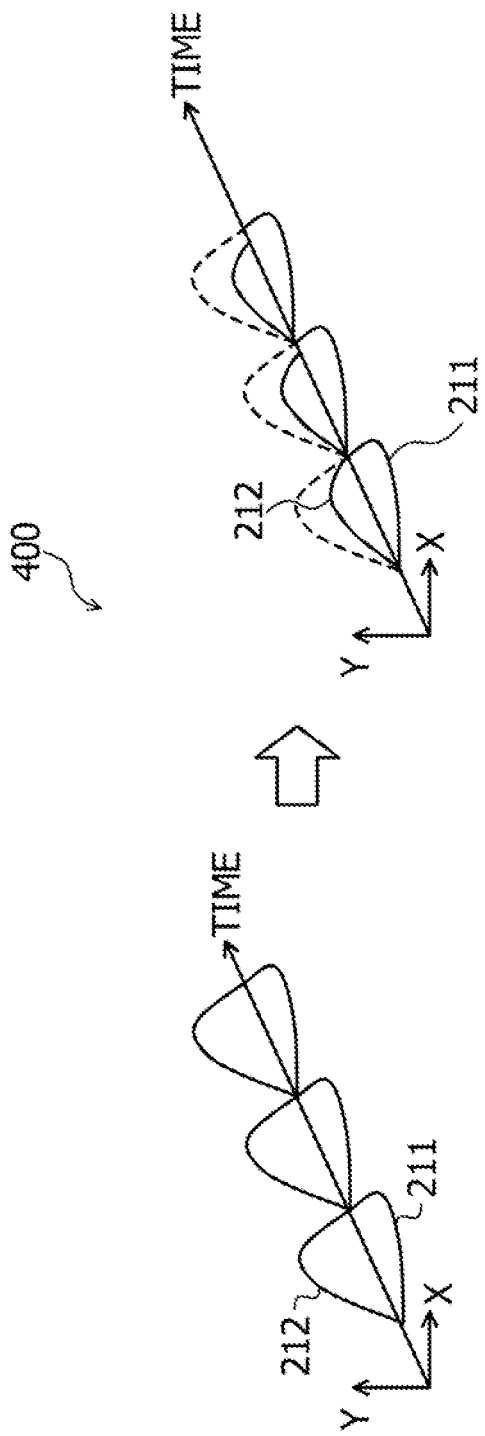
FIG. 4 is a diagram illustrating still another example of a transmission line characteristic to be compensated for by the adaptive equalization circuit according to the embodiment.

FIG. 4 is a diagram illustrating still another example of a transmission line characteristic to be compensated for by the adaptive equalization circuit according to the embodiment. The adaptive equalization circuit 100 illustrated in FIG. 1 compensates for, for example, a cross-polarization loss difference 400 illustrated in FIG. 4. The cross-polarization loss difference 400 is a polarization dependent loss (PDL) in which a difference in loss occurs, in the transmission line, between the X-polarization component 211 contained in the signal light and the Y-polarization component 212 contained in the signal light.

Each of the transmission line characteristics illustrated in FIGS. 2 to 4 depends on installation conditions of the transmission line and the like, and varies during operation (communication). For such transmission line characteristics, the adaptive equalization circuit 100 restores a transmitted signal by, for example, compensating for at least one of the transmission line characteristics illustrated in FIGS. 2 to 4, following variation in the transmission line characteristics, and applying, to each of the separated polarization components, a filter having characteristics inverse to the transmission line characteristics.

(Optical Receiver According to Embodiment)

FIG. 5 is a diagram illustrating an example of the optical receiver according to the embodiment. As illustrated in FIG. 5, an optical receiver 500 according to the embodiment is a digital coherent receiver that includes a coherent receiver front end 510, a waveform distortion compensator 520, a phase shifter 530, the adaptive equalization circuit 100, and the demodulation/data recovery circuit 540.

Using, for example, a received signal and a local oscillation light source, the optical receiver 500 mixes the received signal and the local oscillation light source with an optical phase hybrid, and extracts electric field and phase components of the received signal. Then, the optical receiver 500 restores transmitted data from the received signal by performing photoelectric conversion, analog/digital (A/D) conversion, and digital signal processing on the extracted components.

The waveform distortion compensator 520, the phase shifter 530, the adaptive equalization circuit 100, and the demodulation/data recovery circuit 540 may constitute, for example, a digital circuit 501. For the digital circuit 501, various digital circuits such as a digital signal processor (DSP) and a field programmable gate array (FPGA) may be used.

The coherent receiver front end 510 is a light reception processing unit that coherently receives signal light input via the transmission line into the optical receiver 500 by using local light of the optical receiver 500. For example, the coherent receiver front end 510 mixes and receives the signal light and the local light. Consequently, an H-polarization component signal and a V-polarization component signal contained in the signal light input from the transmission line into the optical receiver 500 may be obtained. The H-polarization component and the V-polarization component are polarization components whose polarization directions are orthogonal to each other. Furthermore, the H-polarization component signal and the V-polarization component signal contain, for example, an I channel (in-phase) component and a Q channel (orthogonal) component, respectively.

The coherent receiver front end 510 performs sampling of the obtained H-polarization component signal and V-polarization component signal to convert the signals into digital signals, and outputs each of the signals converted into the digital signals to the waveform distortion compensator 520.

Furthermore, the coherent receiver front end 510 performs, as the above-described sampling, fractional sampling in which sampling is performed at a frequency that is higher than the signal sampling frequency and is a non-integer multiple of the signal sampling frequency. The fractional sampling performed by the coherent receiver front end 510 will be described later (for example, refer to FIG. 9).

The waveform distortion compensator 520 compensates for a distortion component of each signal output from the coherent receiver front end 510. The distortion component compensated for by the waveform distortion compensator 520 is a distortion component due to wavelength dispersion, for example. The waveform distortion compensator 520 outputs, to the phase shifter 530, each signal compensated for the distortion component.

The phase shifter 530 shifts the phase of each signal output from the waveform distortion compensator 520. This allows for compensation for a phase difference caused by phase variation of the local light, which is a part of a phase difference between the signal light and the local light of each signal. The phase shifter 530 outputs each phase-shifted signal to the adaptive equalization circuit 100.

The adaptive equalization circuit 100 performs adaptive equalization based on each of the H-polarization component signal and the V-polarization component signal ($H_{in}$ and $V_{in}$) output from the phase shifter 530. Then, the adaptive equalization circuit 100 outputs, to the demodulation/data recovery circuit 540, each of the signals ($H_{out}$ and $V_{out}$) obtained by the adaptive equalization.

For example, the adaptive equalization circuit 100 performs the adaptive equalization to separate and extract the H-polarization component signal and the V-polarization component signal transmitted by a transmitting side. Furthermore, the adaptive equalization circuit 100 performs the adaptive equalization to adaptively equalize waveform distortion components due to band limitations such as residual wavelength dispersion, polarization mode dispersion, and wavelength multiplexing, which are equalization residuals of the waveform distortion compensator 520.

The demodulation/data recovery circuit 540 is a decoding unit that performs demodulation and data recovery (decoding) based on each signal output from the adaptive equalization circuit 100. For example, the demodulation/data recovery circuit 540 performs demodulation and data recovery of each signal by determining a combination of a phase and an amplitude indicated by each signal output from the adaptive equalization circuit 100. The demodulation/data recovery circuit 540 outputs data obtained by the demodulation and data recovery.

The optical receiver 500 illustrated in FIG. 5 is an example, and the optical receiver 500 may be modified as appropriate. For example, the digital circuit 501 may have a configuration in which the order of pieces of processing to be performed by the waveform distortion compensator 520, the phase shifter 530, and the adaptive equalization circuit 100 has been changed. Furthermore, the digital circuit 501 may have a configuration in which at least one of the waveform distortion compensator 520 or the phase shifter 530 is omitted.

(Filter Coefficient Update Control Unit According to Embodiment)

Figure 6:
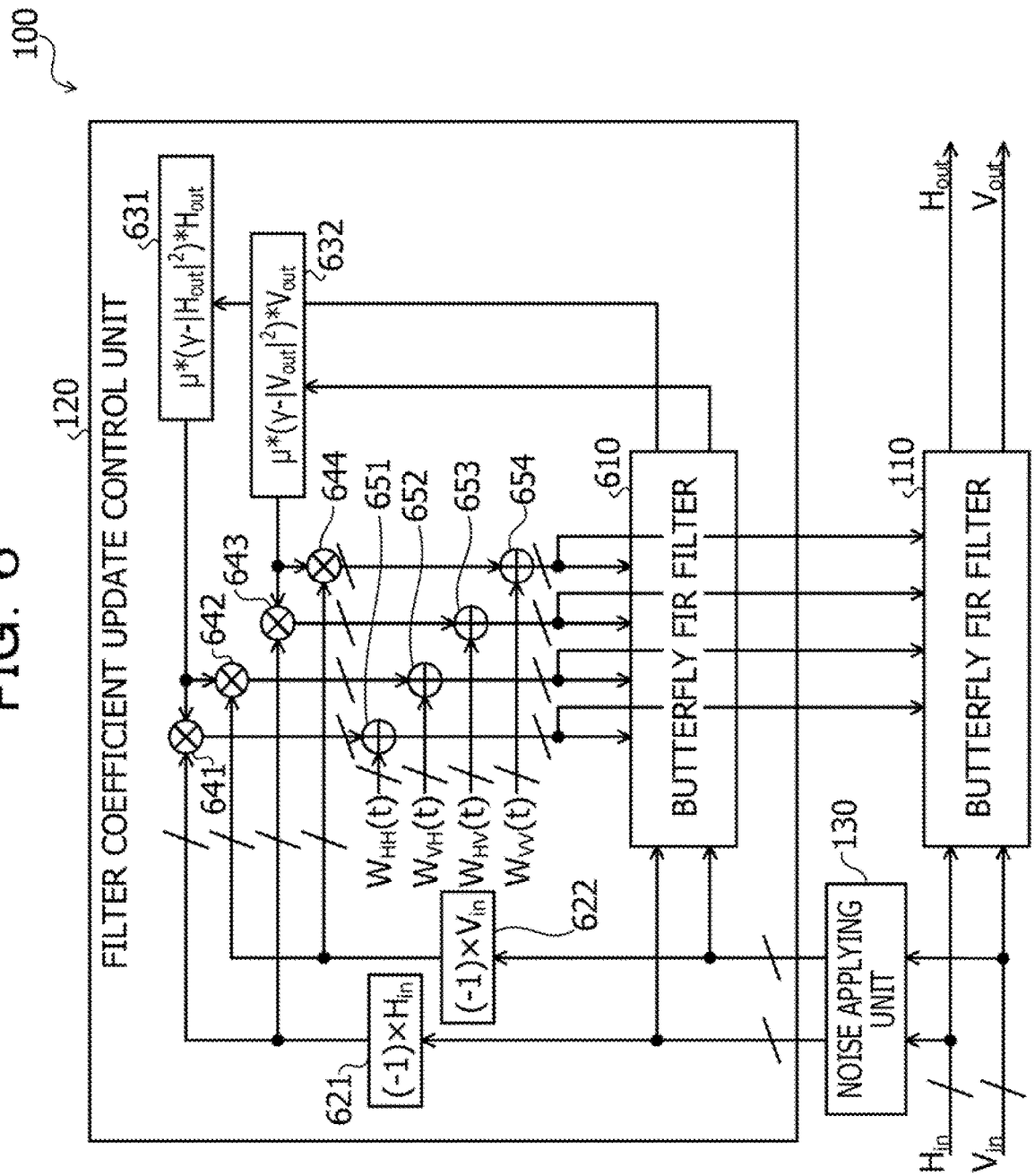
FIG. 6 is a diagram illustrating an example of a filter coefficient update control unit according to the embodiment.

FIG. 6 is a diagram illustrating an example of the filter coefficient update control unit according to the embodiment. In FIG. 6, portions that are similar to those illustrated in FIG. 1 are denoted by the same reference numerals, and descriptions thereof will be omitted. Furthermore, oblique lines placed on arrows in FIG. 6 indicate that signals indicated by the arrows contain pieces of data in parallel for the number of taps (N which will be described later) in the butterfly FIR filter 110.

As illustrated in FIG. 6, the filter coefficient update control unit 120 includes a butterfly FIR filter 610, computing units 621 and 622, computing units 631 and 632, multiplication units 641 to 644, and addition units 651 to 654.

The butterfly FIR filter 610 is an example of a second filter that performs, on the basis of a set tap coefficient, the same filtering as the butterfly FIR filter 110, on the signals $H_{in}$ and $V_{in}$ output from the noise applying unit 130. As with the butterfly FIR filter 110, the butterfly FIR filter 610 may include, for example, an FIR filter having a plurality of taps (for example, refer to FIGS. 7 and 8). The butterfly FIR filter 610 outputs signals $H_{out}$ and $V_{out}$ obtained by filtering to the computing units 631 and 632, respectively.

The computing unit 621 computes $(-1) \times H_{in}$ based on the signal $H_{in}$ output from the noise applying unit 130, and outputs a signal obtained by the computation to the multiplication units 641 and 643. The computing unit 622 computes $(-1) \times V_{in}$ based on the signal $V_{in}$ output from the noise applying unit 130, and outputs a signal obtained by the computation to the multiplication units 642 and 644.

The computing unit 631 computes $\mu^*(\gamma - |H_{out}|^2)^*H_{out}$ based on the signal $H_{out}$ output from the butterfly FIR filter 610, and outputs a signal obtained by the computation to the multiplication units 641 and 642. The computing unit 632 computes $p^*(\gamma - |V_{out}|^2)^*V_{out}$ based on the signal $V_{out}$ output from the butterfly FIR filter 610, and outputs a signal obtained by the computation to the multiplication units 643 and 644.

Here, $\mu$ is a step size expressing the amount of update by coefficient update control to be performed by the filter coefficient update control unit 120. $\gamma$ is a target value in constant power control on the signals $H_{out}$ and $V_{out}$ by the coefficient update control to be performed by the filter coefficient update control unit 120.

The multiplication unit 641 multiplies the signal output from the computing unit 621 by the signal output from the computing unit 631, and outputs a signal obtained by the multiplication to the addition unit 651. The multiplication unit 642 multiplies the signal output from the computing unit 622 by the signal output from the computing unit 631, and outputs a signal obtained by the multiplication to the addition unit 652. The multiplication unit 643 multiplies the signal output from the computing unit 621 by the signal output from the computing unit 632, and outputs a signal obtained by the multiplication to the addition unit 653. The multiplication unit 644 multiplies the signal output from the computing unit 622 by the signal output from the computing unit 632, and outputs a signal obtained by the multiplication to the addition unit 654.

The addition unit 651 adds the signal output from the multiplication unit 641 to a tap coefficient $W_{HH}(t)$ currently set for the butterfly FIR filters 110 and 610, and newly sets a tap coefficient $W_{HH}$ obtained by the addition for the butterfly FIR filters 110 and 610. The addition unit 652 adds the signal output from the multiplication unit 642 to a tap coefficient $W_{VH}(t)$ currently set for the butterfly FIR filters 110 and 610, and newly sets a tap coefficient $W_{VH}$ obtained by the addition for the butterfly FIR filters 110 and 610.

The addition unit 653 adds the signal output from the multiplication unit 643 to a tap coefficient $W_{HV}(t)$ currently set for the butterfly FIR filters 110 and 610, and newly sets a tap coefficient $W_{HV}$ obtained by the addition for the butterfly FIR filters 110 and 610. The addition unit 654 adds the signal output from the multiplication unit 644 to a tap coefficient $W_{VV}(t)$ currently set for the butterfly FIR filters 110 and 610, and newly sets a tap coefficient $W_{VV}$ obtained by the addition for the butterfly FIR filters 110 and 610.

Thus, the filter coefficient update control unit 120 may set, for the butterfly FIR filter 110, the tap coefficients $W_{HH}$, $W_{VH}$, $W_{HV}$, and $W_{VV}$ that compensate for the transmission line characteristics of the signals $H_{in}$ and $V_{in}$ in the butterfly FIR filter 110. Processing performed by the butterfly FIR filter 110 based on the tap coefficients $W_{HH}$, $W_{VH}$, $W_{HV}$, and $W_{VV}$ will be described later.

Furthermore, in a configuration illustrated in FIG. 6, the filter coefficient update control unit 120 has the butterfly FIR filter 610 that performs the same filtering as the butterfly FIR filter 110, on the signals $H_{in}$ and $V_{in}$ to which noise has been applied by the noise applying unit 130. The filter coefficient update control unit 120 sets tap coefficients for the butterfly FIR filter 110 on the basis of the signals $H_{in}$ and $V_{in}$ to which noise has been applied by the noise applying unit 130 and the signals $H_{out}$ and $V_{out}$ that have been filtered by the butterfly FIR filter 610.

Thus, the filter coefficient update control unit 120 may set tap coefficients for the butterfly FIR filter 110 on the basis of the signals $H_{in}$ and $V_{in}$ to which noise has been applied by the noise applying unit 130. Furthermore, the signals $H_{in}$ and $V_{in}$ input into the butterfly FIR filter 110 may be the signals $H_{in}$ and $V_{in}$ to which no noise has been applied by the noise applying unit 130. Consequently, deterioration of the signals $H_{out}$ and $V_{out}$ output from the butterfly FIR filter 110 may be suppressed.

(Butterfly FIR Filter According to Embodiment)

Figure 7:
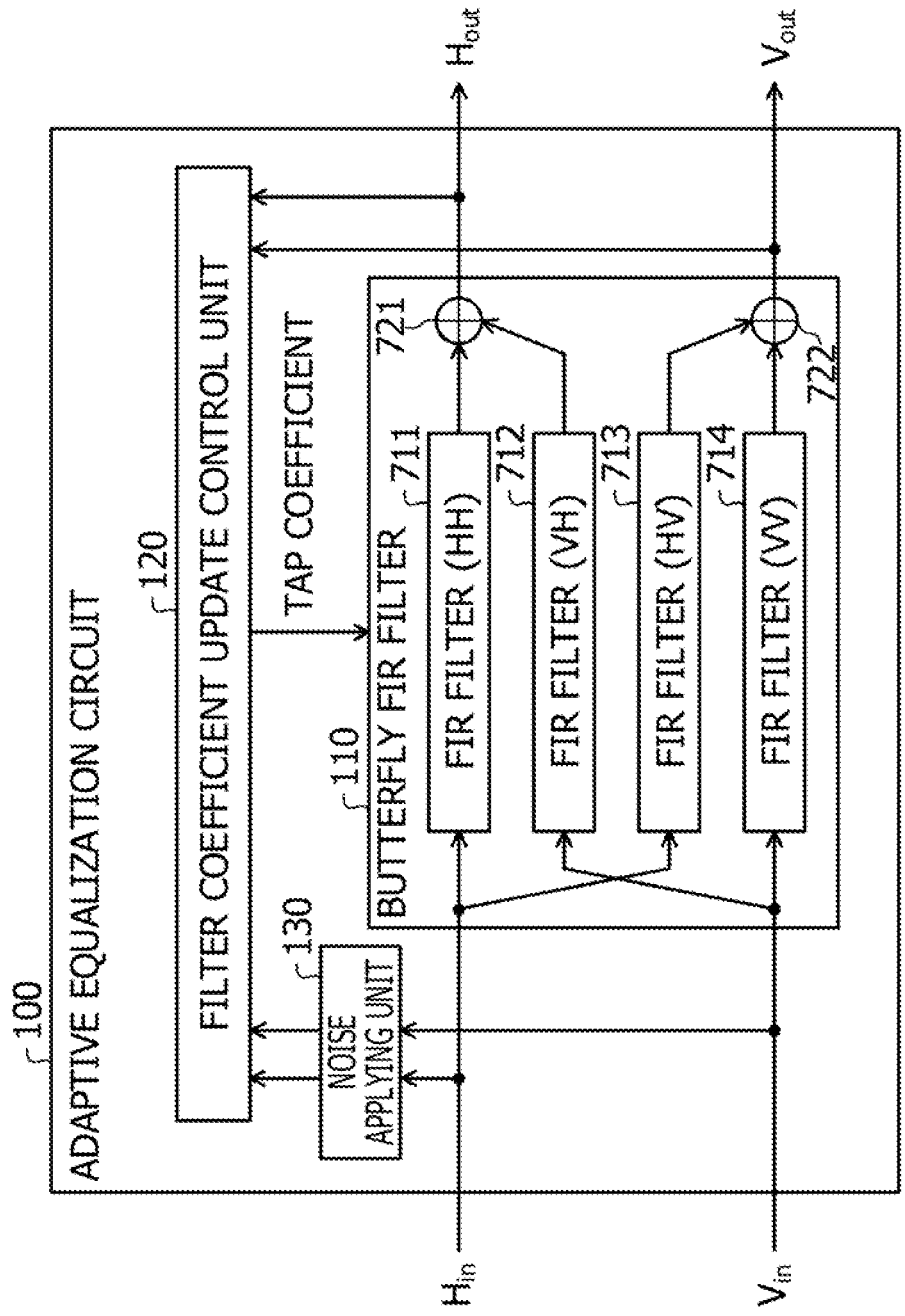
FIG. 7 is a diagram illustrating an example of a butterfly finite impulse response (FIR) filter according to the embodiment.

FIG. 7 is a diagram illustrating an example of a butterfly FIR filter according to the embodiment. A configuration of the butterfly FIR filter 110 will be described, and the butterfly FIR filter 610 also has a configuration similar to that of the butterfly FIR filter 110. The butterfly FIR filter 110 includes, for example, FIR filters 711 to 714 and addition units 721 and 722 as illustrated in FIG. 7.

The above-described tap coefficients $W_{HH}$, $W_{VH}$, $W_{HV}$, and $W_{VV}$ generated by the filter coefficient update control unit 120 are set for taps of the FIR filters 711 to 714, respectively. However, as will be described later, each of the FIR filters 711 to 714 performs filtering while periodically switching between a set tap coefficient and a tap coefficient obtained by delaying (shifting) the set tap coefficient.

An H-polarization component signal ($H_{in}$) input into the butterfly FIR filter 110 is an H-polarization component at the time of reception of signal light that has not been compensated for polarization rotation generated in the transmission line. For this reason, the H-polarization component signal ($H_{in}$) input into the butterfly FIR filter 110 contains a mixture of an H-polarization component and a V-polarization component at the time of transmission of the signal light.

Similarly, a V-polarization component signal ($V_{in}$) input into the butterfly FIR filter 110 is a V-polarization component at the time of reception of the signal light that has not been compensated for the polarization rotation generated in the transmission line. For this reason, the V-polarization component signal ($V_{in}$) input into the butterfly FIR filter 110 contains a mixture of an H-polarization component and a V-polarization component at the time of transmission of the signal light.

The FIR filter 711 (HH) extracts the H-polarization component at the time of transmission from the H-polarization component signal ($H_{in}$) input into the butterfly FIR filter 110. The FIR filter 712 (VH) extracts the H-polarization component at the time of transmission from the V-polarization component signal ($V_{in}$) input into the butterfly FIR filter 110. Each of the FIR filters 711 and 712 outputs the extracted H-polarization component to the addition unit 721.

The FIR filter 713 (HV) extracts the V-polarization component at the time of transmission from the H-polarization component signal ($H_{in}$) input into the butterfly FIR filter 110. The FIR filter 714 (VV) extracts the V-polarization component at the time of transmission from the V-polarization component signal ($V_{in}$) input into the butterfly FIR filter 110. Each of the FIR filters 713 and 714 outputs the extracted V-polarization component to the addition unit 722.

The addition unit 721 adds up the H-polarization components output from the FIR filters 711 and 712, and outputs the addition result as an H-polarization component signal ($H_{out}$). The addition unit 722 adds up the V-polarization components output from the FIR filters 713 and 714, and outputs the addition result as a V-polarization component signal ($V_{out}$). Thus, the adaptive equalization circuit 100 may extract and output the H-polarization component signal ($H_{out}$) and the V-polarization component signal ($V_{out}$) at the time of transmission, from the input H-polarization component signal and V-polarization component signal.

The H-polarization component signal ($H_{out}$) at time t may be expressed by, for example, Equation (1) below. A first half of the right-hand side of Equation (1) below indicates processing by the FIR filter 711, and a second half of the right-hand side of Equation (1) below indicates processing by the FIR filter 712. N is the number of taps each of the FIR filters 711 to 714 has. n is a tap number (n=1 to N) assigned to N taps in each of the FIR filters 711 to 714. $W_{HH}[n]$ is a tap coefficient corresponding to a tap number n output from the filter coefficient update control unit 120 to the FIR filter 711. $W_{VH}[n]$ is a tap coefficient corresponding to a tap number n output from the filter coefficient update control unit 120 to the FIR filter 712.

[Math. 1]

$$H_{out}[t] = \sum_{n=0}^{N-1} W_{HH}[n]H_{in}[t-n] + \sum_{n=0}^{N-1} W_{VH}[n]V_{in}[t-n] \quad (1)$$

Similarly, the V-polarization component signal ($V_{out}$) at time t may be expressed by, for example, Equation (2) below. A first half of the right-hand side of Equation (2) below indicates processing by the FIR filter 713, and a second half of the right-hand side of Equation (2) below indicates processing by the FIR filter 714. $W_{HV}[n]$ is a tap coefficient corresponding to a tap number n output from the filter coefficient update control unit 120 to the FIR filter 713. $W_{VV}[n]$ is a tap coefficient corresponding to a tap number n output from the filter coefficient update control unit 120 to the FIR filter 714.

[Math. 2]

$$V_{out}[t] = \sum_{n=0}^{N-1} W_{HV}[n]H_{in}[t-n] + \sum_{n=0}^{N-1} W_{VV}[n]V_{in}[t-n] \quad (2)$$

The filter coefficient update control unit 120 updates each tap coefficient for the FIR filters 711 to 714 by feedback processing based on each signal output from the addition units 721 and 722 so as to follow variation in transmission line characteristics.

(FIR Filter According to Embodiment)

Figure 8:
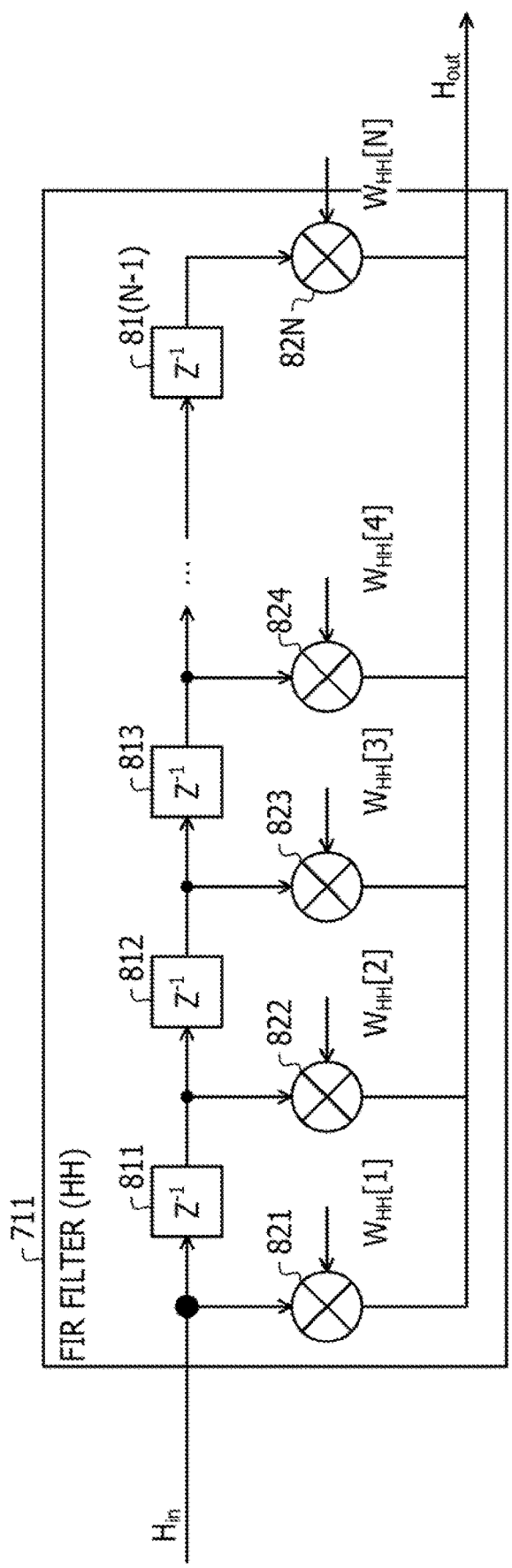
FIG. 8 is a diagram illustrating an example of an FIR filter according to the embodiment.

FIG. 8 is a diagram illustrating an example of an FIR filter according to the embodiment. A configuration of the FIR filter 711 will be described, and the FIR filters 712 to 714 also have configurations similar to that of the FIR filter 711. As illustrated in FIG. 8, the FIR filter 711 is an FIR filter including N-1 delay units 811 to 81(N-1) and N multiplication units 821 to 82N, and the number of taps is N. $W_{HH}[1]$ to $W_{HH}[N]$ illustrated in FIG. 8 are tap coefficients corresponding to the number of taps (N) contained in the tap coefficient $W_{HH}$ set for the butterfly FIR filter 110 by the above-described filter coefficient update control unit 120.

For example, the delay unit 811 delays a signal ($H_{in}$) input into the FIR filter 711, and outputs the delayed signal to the delay unit 812 and the multiplication unit 822. Furthermore, the delay unit 812 delays the signal output from the delay unit 811 and outputs the delayed signal to the delay unit 813 and the multiplication unit 823. Furthermore, the delay unit 81(N-1) delays the signal output from the delay unit 81(N-2), and outputs the delayed signal to the multiplication unit 82N.

For example, the multiplication unit 821 multiplies the signal ($H_{in}$) input into the FIR filter 711 by the tap coefficient $W_{HH}[1]$. Furthermore, the multiplication unit 822 multiplies the signal output from the delay unit 811 by the tap coefficient $W_H[2]$. Furthermore, the multiplication unit 82N multiplies the signal output from the delay unit 81(N-1) by the tap coefficient $W_{HH}[N]$. Results of the multiplication performed by the multiplication units 821 to 82N are added up and output from the FIR filter 711 as a filtered signal ($H_{out}$).

The filter coefficient update control unit 120 illustrated in FIG. 7 updates the tap coefficients $W_{HH}[1]$ to $W_{HH}[N]$ set for the multiplication units 821 to 82N, respectively, by performing feedback processing so as to follow changes in transmission line characteristics.

(Fractional Sampling by Optical Receiver According to Embodiment)

Figure 9:
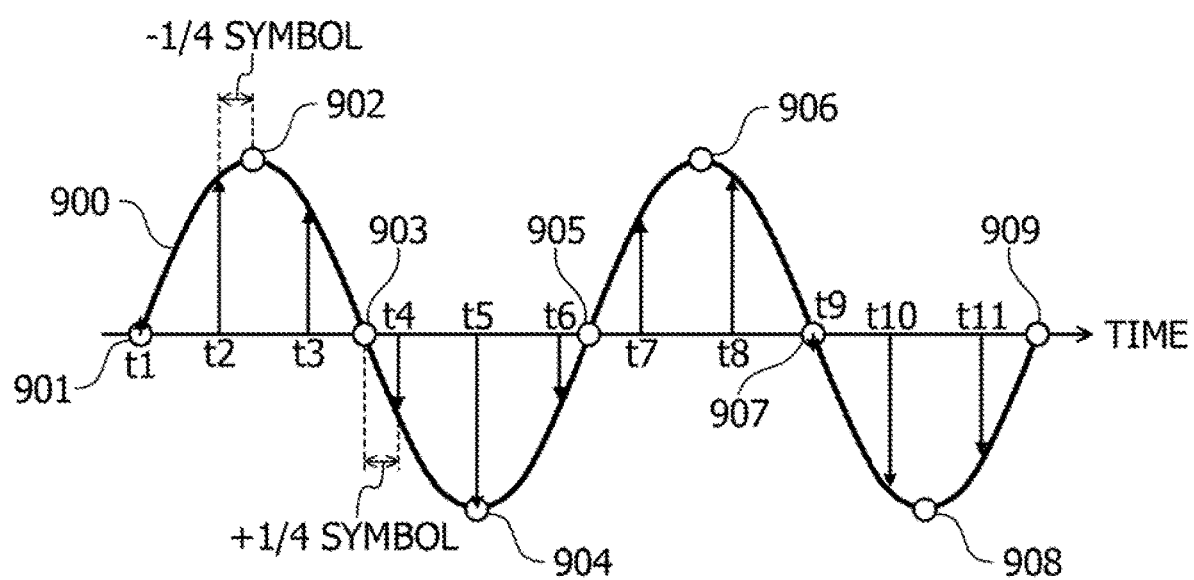
FIG. 9 is a diagram illustrating an example of fractional sampling by the optical receiver according to the embodiment.

FIG. 9 is a diagram illustrating an example of fractional sampling by the optical receiver according to the embodiment. In FIG. 9, a horizontal axis indicates the time, and a vertical axis indicates the amplitude of signal light received by the optical receiver 500.

A signal waveform 900 indicates an amplitude waveform of the signal light received by the optical receiver 500. Symbol points 901 to 909 are sampling points at the time of conversion from an analog signal to a digital signal on the transmitting side of the signal light received by the optical receiver 500.

In the coherent receiver front end 510, fractional sampling is performed as described above. For example, sampling at a frequency higher than the signal sampling frequency is called oversampling. Then, among types of oversampling, sampling at a frequency that is not an integer multiple of the signal sampling frequency is called fractional sampling. The signal sampling frequency is a sampling frequency at the time of conversion from an analog signal to a digital signal on the transmitting side, that is, periods indicated by the symbol points 901 to 909.

For example, the coherent receiver front end 510 performs sampling on the signal waveform 900 at fractional sample points t1 to t11 The fractional sample points t1 to t11 are timings of a frequency that is 1.33 times (4/3 times) the signal sampling frequency. Thus, the coherent receiver front end 510 may perform 133-times fractional sampling.

As with 2-times (integer multiple) oversampling, 133-times fractional sampling, with more sample points than 1-time sampling (normal sampling), allows for more accurate compensation for transmission line characteristics. Furthermore, since 133-times fractional sampling has wider sampling intervals than 2-times oversampling, the number of samples may be reduced in a case where the time width of a signal to be processed is the same.

Thus, the number of taps in the butterfly FIR filter 110 may be reduced. By reducing the number of taps in the butterfly FIR filter 110, the circuit scale of the butterfly FIR filter 110 may be reduced and the processing amount of the butterfly FIR filter 110 may be reduced, for example.

The adaptive equalization circuit 100 performs adaptive equalization on a signal fractionally sampled by the coherent receiver front end 510. The adaptive equalization on the fractionally sampled signal is referred to as fractional adaptive equalization.

Here, in fractional sampling, periods of the fractional sample points t1 to t11 do not match periods of the symbol points 901 to 909. To dissolve that mismatch, a plurality of sets of tap coefficients has to be used for fractional adaptive equalization. For example, in 1.33-times fractional sampling, three symbols constitute one period, which creates a necessity for three sets of tap coefficients.

For example, three sets of tap coefficients for the FIR filter 711 are referred to as $W_{HH}$, $W_{HH}'$, and $W_{HH}''$. In a case where the symbol points and the fractional sample points are matched, the tap coefficient $W_{HH}$ is obtained by the processing by the filter coefficient update control unit 120 as described above with reference to FIG. 6.

A case in which the symbol points and the fractional sample points are mismatched differs from the case in which the symbol points and the fractional sample points are matched in that there is a mismatch between the points. Thus, in the case where the symbol points and the fractional sample points are mismatched, the tap coefficients $W_{HH}'$ and $W_{HH}''$ obtained by delaying the tap coefficient $W_{HH}$ are used.

In other words, the tap coefficients $W_{HH}'$ and $W_{HH}''$ may be obtained by giving, to the tap coefficient $W_{HH}$, a delay corresponding to the mismatch between the symbol points and the fractional sampling points. For example, the tap coefficient $W_{HH}'$ is obtained by delaying $W_{HH}$ by $-\frac{1}{4}$ symbol time. Furthermore, the tap coefficient $W_{HH}''$ is obtained by delaying $W_{HH}$ by $+\frac{1}{4}$ symbol time. Delaying of a tap coefficient will be described later (refer to FIG. 11).

Next, computing equations that express an output $H_{HH,out}$ of the FIR filter 711 in the adaptive equalization circuit 100 that performs 1.33-times fractional adaptive equalization will be described, and the same applies to computing equations that express outputs of the FIR filters 712 to 714. The output $H_{HH,out}$ may be expressed by, for example, Equations (3) to (5) below. In Equations (3) to (5) below, $t_{symbol}$ indicates a symbol time, $t_{sample}$ indicates a sample time, n indicates a tap number, and N indicates the number of taps. Furthermore, $W_{HH}$, $W_{HH}'$, and $W_{HH}''$ are the above-described three sets of tap coefficients.

Equation (3) below indicates the output $H_{HH,out}$ of the FIR filter 711 at a symbol time that can be divided evenly by 3 ($t_{symbol}$% 3==0). As indicated by Equation (3) below, the adaptive equalization circuit 100 uses $W_{HH}$ as a tap coefficient for a symbol time that can be divided evenly by 3.

[Math. 3]

$$H_{HH,out}[t_{symbol}] = \sum_{n=0}^{N-1} W_{HH}[n]H_{in}[t_{sample} - n] \quad (3)$$

$$(t_{symbol} \% 3 == 0)$$

Equation (4) below indicates the output $H_{HH,out}$ of the FIR filter 711 at a symbol time that leaves a remainder of 1 when divided by 3 ($t_{symbol}$% 3==1). As indicated by Equation (4) below, the adaptive equalization circuit 100 uses $W_{HH}'$ as a tap coefficient for a symbol time that leaves a remainder of 1 when divided by 3,

[Math. 4]

$$H_{HH,out}[t_{symbol}] = \sum_{n=0}^{N-1} W_{HH}[n]'H_{in}[t_{sample} - n] \quad (4)$$

$$(t_{symbol} \% 3 == 1)$$

Equation (5) below indicates the output $H_{HH,out}$ of the FIR filter 711 at a symbol time that leaves a remainder of 2 when divided by 3 ($t_{symbol}$% 3==2). As indicated by Equation (5) below, the adaptive equalization circuit 100 uses $W_{HH}''$ as a tap coefficient for a symbol time that leaves a remainder of 2 when divided by 3.

[Math. 5]

$$H_{HH,out}[t_{symbol}] = \sum_{n=0}^{N-1} W_{HH}[n]''H_{in}[t_{sample} - n] \quad (5)$$

$$(t_{symbol} \% 3 == 2)$$

(Adaptive Equalization by Adaptive Equalization Circuit According to Embodiment)

Figure 10:
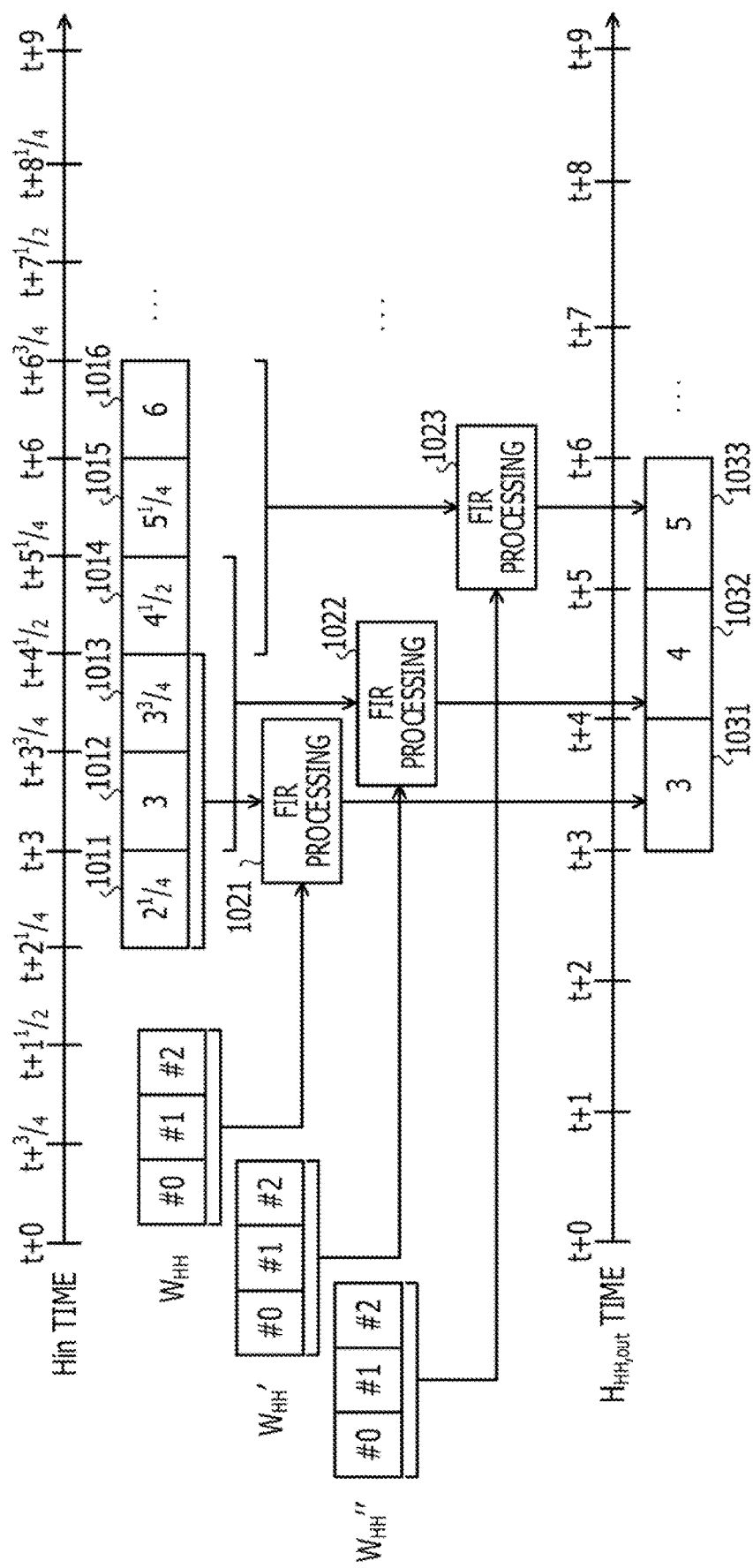
FIG. 10 is a diagram illustrating an example of adaptive equalization by the adaptive equalization circuit according to the embodiment.

FIG. 10 is a diagram illustrating an example of adaptive equalization by the adaptive equalization circuit according to the embodiment. Adaptive equalization by the FIR filter 711 will be described, and the same applies to adaptive equalization by the FIR filters 712 to 714.

In 1.33-times fractional sampling, when a time interval of the output $H_{HH,out}$ (symbol time) of the FIR filter 711 is 1, a time interval of an input $H_{in}$ (sample time) is $\frac{3}{4}$. For example, when the number of taps of the FIR filter 711 is 3 (N=3), three inputs that differ from one another in amount of delay are subjected to FIR processing to obtain the output $H_{HH,out}$.

$W_{HH}$, $W_{HH}'$, and $W_{HH}''$ illustrated in FIG. 10 are the above-described three sets of tap coefficients. Each of $W_{HH}$, $W_{HH}'$, and $W_{HH}''$ contains coefficients #0 to #2 corresponding to the number of taps (N=3) of the FIR filter 711. Sampling results 1011 to 1016 are results of sampling at $\frac{3}{4}$ intervals in $H_{in}$ time by the coherent receiver front end 510.

The FIR filter 711 performs FIR processing 1021 based on the sampling result 1011 at time t+2·¼, the sampling result 1012 at time t+3, the sampling result 1013 at time t+3·¾, and $W_{HH}$. For example, the adaptive equalization circuit 100 adds up a result of multiplication of the sampling result 1011 by the coefficient #0 for $W_{HH}$, a result of multiplication of the sampling result 1012 by the coefficient #1 for $W_{HH}$, and a result of multiplication of the sampling result 1013 by the coefficient #2 for $W_{HH}$. Thus, an output 1031 (3) at time t+3 in $H_{HH,out}$ may be obtained.

Furthermore, the FIR filter 711 performs FIR processing 1022 based on the sampling result 1012 at time t+3, the sampling result 1013 at time t+3·¾, the sampling result 1014 at time t+4·½, and $W_{HH}'$. For example, the adaptive equalization circuit 100 adds up a result of multiplication of the sampling result 1012 by the coefficient #0 for $W_{HH}'$, a result of multiplication of the sampling result 1013 by the coefficient #1 for $W_{HH}'$, and a result of multiplication of the sampling result 1014 by the coefficient #2 for $W_{HH}$. Thus, an output 1032 (4) at time t+4 in $H_{HH,out}$ may be obtained.

Furthermore, the FIR filter 711 performs FIR processing 1023 based on the sampling result 1014 at time t+4·½, the sampling result 1015 at time t+5·¼, the sampling result 1016 at time t+6, and $W_{HH}''$. For example, the adaptive equalization circuit 100 adds up a result of multiplication of the sampling result 1014 by the coefficient #0 for $W_{HH}''$, a result of multiplication of the sampling result 1015 by the coefficient #1 for $W_{HH}''$, and a result of multiplication of the sampling result 1016 by the coefficient #2 for $W_{HH}''$. Thus, an output 1033 (5) at time t+5 in $H_{HH,out}$ may be obtained.

Similarly thereafter, the FIR filter 711 may output filtering results by performing FIR processing while shifting the sampling results to be processed and switching among $W_{HH}$, $W_{HH}'$, and $W_{HH}''$.

(Decrease in Accuracy of Compensation for Transmission Line Characteristics by Fractional Adaptive Equalization)

Figure 11:
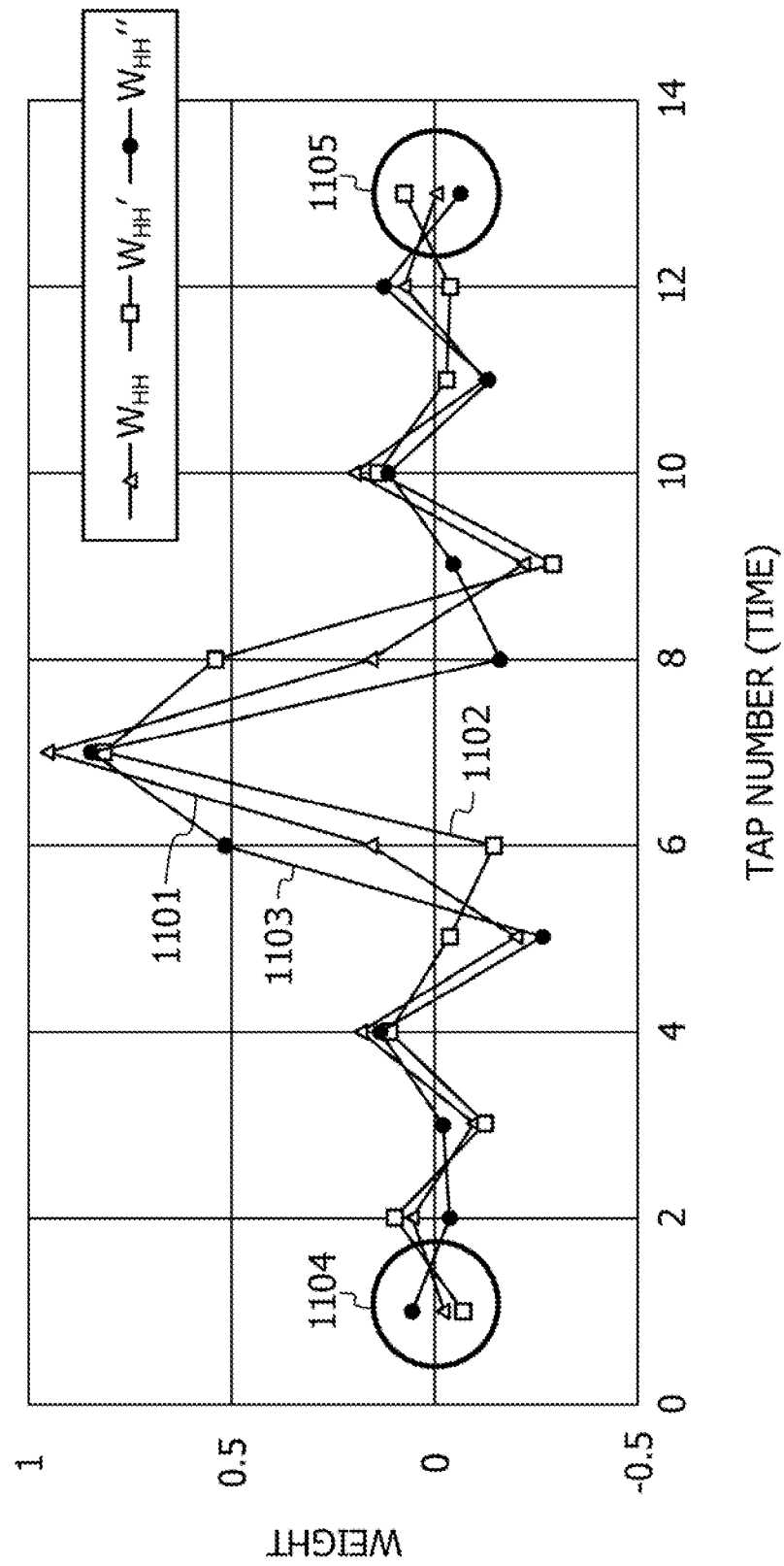
FIG. 11 is a reference drawing illustrating an example of a decrease in accuracy of compensation for transmission line characteristics by fractional adaptive equalization.

FIG. 11 is a reference drawing illustrating an example of a decrease in accuracy of compensation for transmission line characteristics by fractional adaptive equalization. The FIR filter 711 will be described, and the same applies to the FIR filters 712 to 714.

In FIG. 11, a horizontal axis indicates the tap number in the FIR filter 711 (that is, the delay time in FIR processing). A vertical axis indicates weight (amplitude of a complex number) in FIR processing by the FIR filter 711, that is, a tap coefficient. Tap coefficients 1101 to 1103 indicate the above-described tap coefficients $W_{HH}$, $W_{HH}'$, and $W_{HH}''$, respectively.

In FIG. 11, the tap coefficients 1101 to 1103 in a case where it is assumed that the noise applying unit 130 is not disposed in the adaptive equalization circuit 100 are indicated for reference. Furthermore, in the example illustrated in FIG. 11, the number of taps in the FIR filter 711 is 13 (N=13), and each tap is assigned with a tap number from 1 to 13. The above-described delaying of a tap coefficient is, for example, shifting the tap coefficient 1101 in the horizontal axis direction (time direction) in FIG. 11 by computation.

As indicated by the tap coefficients 1101 to 1103 in FIG. 1, for example, in the processing by the filter coefficient update control unit 120 described with reference to FIG. 6, a tap coefficient is controlled to decrease at around ends of the tap numbers.

However, as indicated by ends 1104 and 1105 of the tap coefficients 1102 and 1103, the tap coefficients $W_{HH}'$ and $W_{HH}''$ fail to converge to 0 at the ends of the tap numbers (portions where the amount of delay is large). Thus, in fractional adaptive equalization, $W_{HH}'$ and $W_{HH}''$ may fail to converge within the number of taps of the FIR filter 711.

In a case where $W_{HH}'$ and $W_{HH}''$ fail to converge within the number of taps, accuracy of compensation for transmission line characteristics decreases, and a reception performance of the optical receiver 500 deteriorates. Note that $W_{HH}$ is calculated so as to converge within the number of taps of the FIR filter 711 by the processing by the filter coefficient update control unit 120 described with reference to FIG. 6.

On the other hand, the adaptive equalization circuit 100 uses the noise applying unit 130 to apply noise outside a signal band to an input signal of the filter coefficient update control unit 120, thereby allowing $W_{HH}'$ and $W_{HH}''$ to converge within the number of taps of the FIR filter 711. This will be described later (for example, refer to FIG. 14).

(Gain Characteristic for Each Frequency in Fractional Adaptive Equalization)

Figure 12:
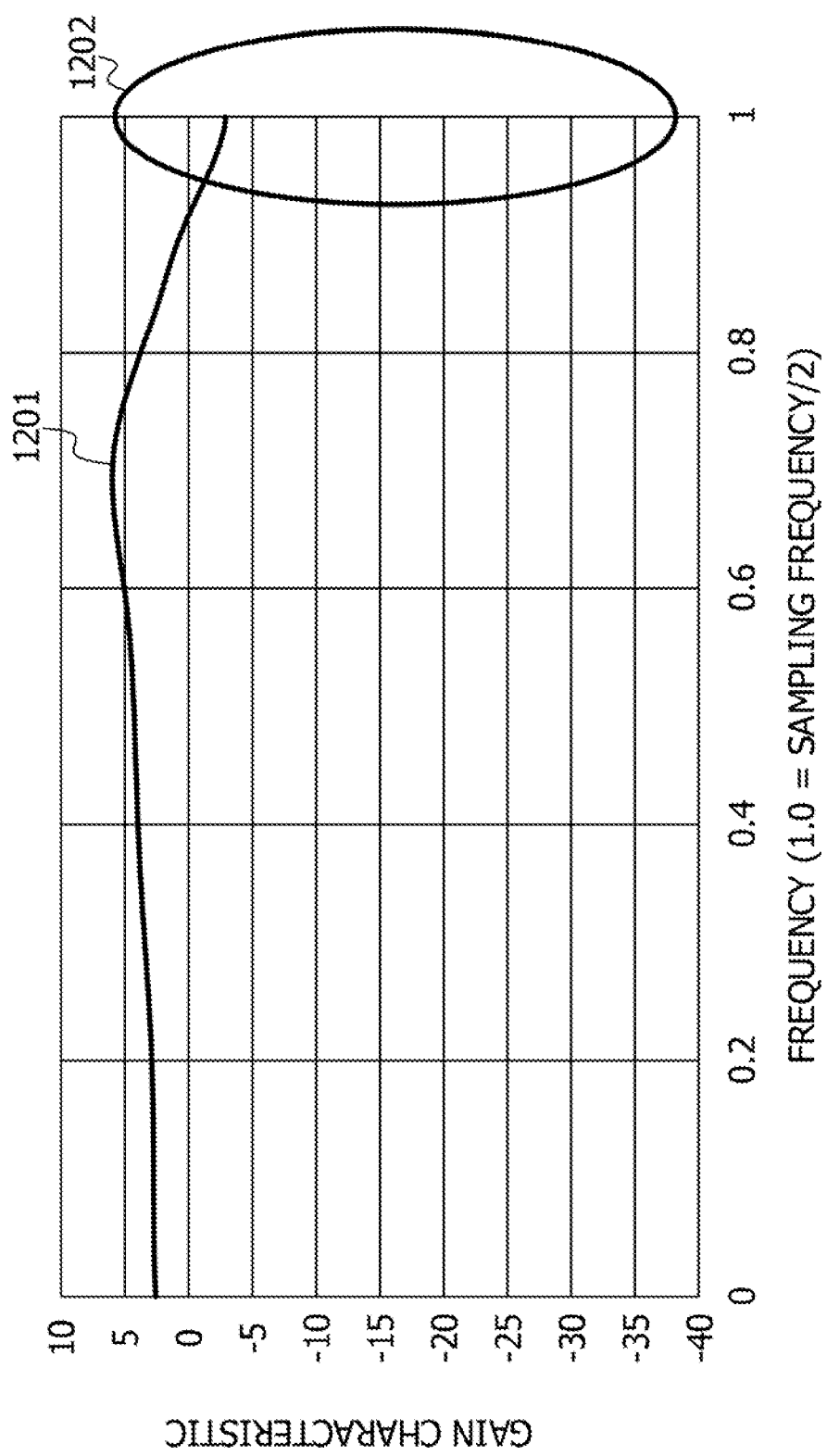
FIG. 12 is a reference drawing illustrating an example of a gain characteristic for each frequency in fractional adaptive equalization.

FIG. 12 is a reference drawing illustrating an example of a gain characteristic for each frequency in fractional adaptive equalization. In FIG. 12, a horizontal axis indicates the frequency of a signal output from the adaptive equalization circuit 100, and ½ of a sampling frequency is indicated as 1.0. A vertical axis indicates the gain characteristic (that is, magnitude of a tap coefficient) of the signal output from the adaptive equalization circuit 100.

A frequency gain characteristic 1201 indicates a gain characteristic for each frequency of the signal output from the adaptive equalization circuit 100, Furthermore, in FIG. 12, the frequency gain characteristic 1201 in a case where it is assumed that the noise applying unit 130 is not disposed in the adaptive equalization circuit 100 is indicated for reference. An out-of-band domain 1202 is a domain outside a signal band in the frequency gain characteristic 1201.

The inventor has discovered, as illustrated in FIG. 12, that in fractional adaptive equalization, in a case where the delayed $W_{HH}'$ and $W_{HH}''$ fail to converge within the number of taps (in a case where the reception performance deteriorates), the undelayed tap coefficient $W_{HH}$ does not attenuate outside the signal band. It has subsequently turned out that attenuating the tap coefficient $W_{HH}$ outside the signal band causes the delayed $W_{HH}'$ and $W_{HH}''$ to converge within the number of taps. Here, the signal band is, for example, in a range from 0 to 0.6 in the example illustrated in FIG. 12.

The adaptive equalization circuit 100 uses this to generate a tap coefficient $W_{HH}$ attenuated outside the signal band, thereby allowing the delayed tap coefficients $W_{HH}'$ and $W_{HH}''$ to converge within the number of taps. Then, in order to generate the tap coefficient $W_{HH}$ attenuated outside the signal band, the adaptive equalization circuit 100 uses the noise applying unit 130 to apply noise outside the signal band to the input signal of the filter coefficient update control unit 120.

(Gain Characteristics for Each Frequency in Adaptive Equalization Circuit According to Embodiment)

Figure 13:
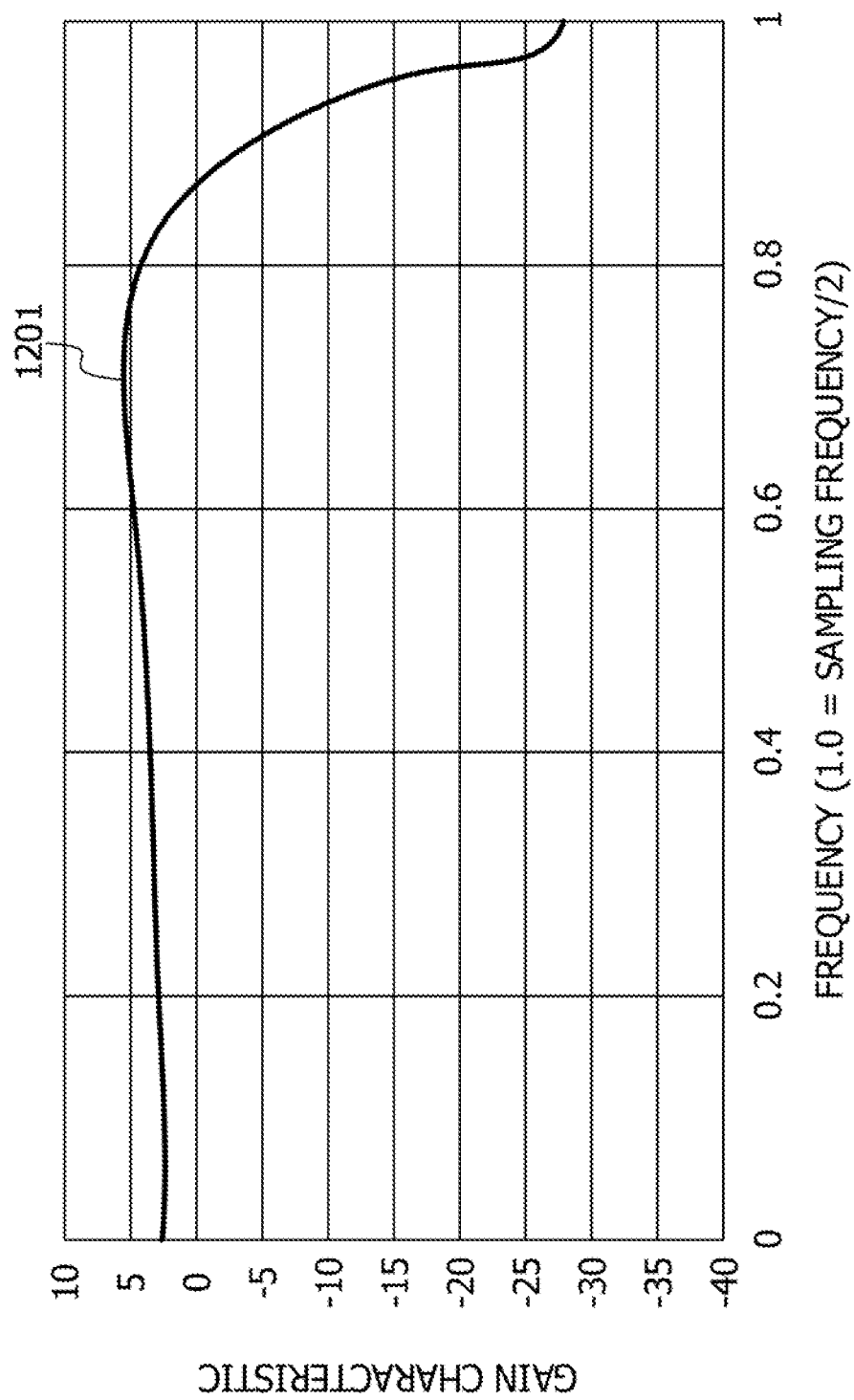
FIG. 13 is a graph illustrating an example of a gain characteristic for each frequency in the adaptive equalization circuit according to the embodiment.

FIG. 13 is a graph illustrating an example of a gain characteristic for each frequency in the adaptive equalization circuit according to the embodiment. In FIG. 13, portions that are similar to those illustrated in FIG. 12 are denoted by the same reference numerals, and descriptions thereof will be omitted. As described above, the adaptive equalization circuit 100 uses the noise applying unit 130 to apply noise outside the signal band to the input signal of the filter coefficient update control unit 120.

Here, the filter coefficient update control unit 120 generates filter coefficients so as to keep output power of the butterfly FIR filter 110 constant (for example, refer to FIG. 6). For this reason, when noise outside the signal band (high peak) is applied to the input signal of the filter coefficient update control unit 120, in order to cancel the applied noise, an attenuated tap coefficient $W_{HH}$ is generated outside the signal band so as to decrease the gain characteristic outside the signal band of the tap coefficient.

Thus, the frequency gain characteristic 1201 becomes, for example, the characteristic illustrated in FIG. 13, and the tap coefficient $W_{HH}$ attenuated outside the signal band may be generated. This allows the above-described delayed tap coefficients $W_{HH}'$ and $W_{HH}''$ to converge within the number of taps.

(Suppression of Decrease in Accuracy of Compensation for Transmission Line Characteristics by Adaptive Equalization Circuit According to Embodiment)

Figure 14:
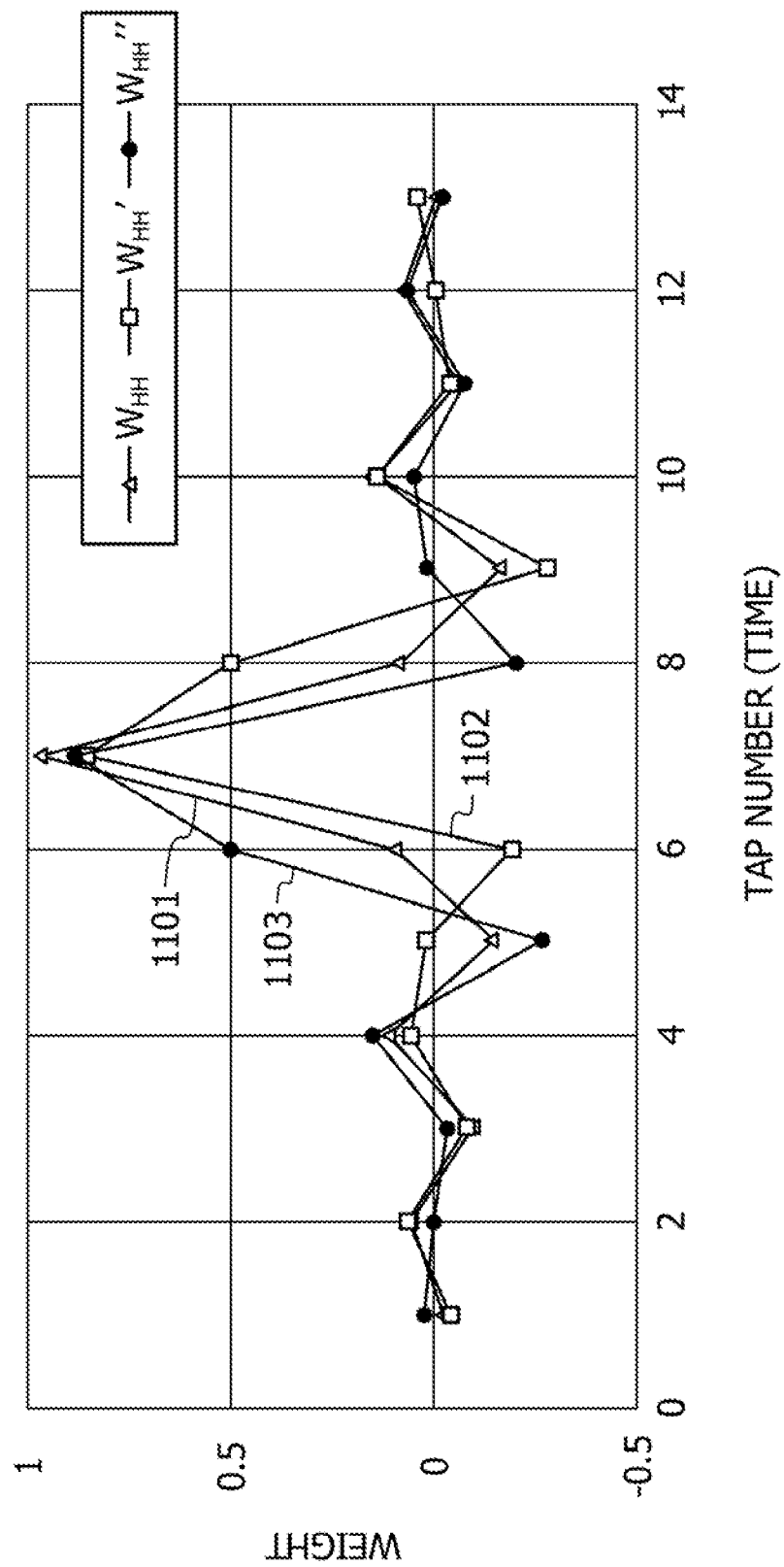
FIG. 14 is a graph illustrating an example of suppression of a decrease in accuracy of compensation for transmission fine characteristics by the adaptive equalization circuit according to the embodiment.

FIG. 14 is a graph illustrating an example of suppression of a decrease in accuracy of compensation for transmission line characteristics by the adaptive equalization circuit according to the embodiment. In FIG. 14, portions that are similar to those illustrated in FIG. 11 are denoted by the same reference numerals, and descriptions thereof will be omitted. As described above, generating the tap coefficient. $W_{HH}$ attenuated outside the signal band causes the tap coefficients 1101 to 1103 to be, for example, those illustrated in FIG. 14.

In the example illustrated in FIG. 14, the tap coefficients $W_{HH}$, $W_{HH}'$, and $W_{HH}''$ converge to 0 at ends of tap numbers (portions where the amount of delay is large). Thus, the adaptive equalization circuit 100 also allows $W_{HH}'$ and $W_{HH}''$ to converge within the number of taps of the FIR filter 711. Consequently, a decrease in accuracy of compensation for transmission line characteristics may be suppressed, and reception performance of the optical receiver 500 may be improved.

(Processing by Adaptive Equalization Circuit According to Embodiment)

Figure 15:
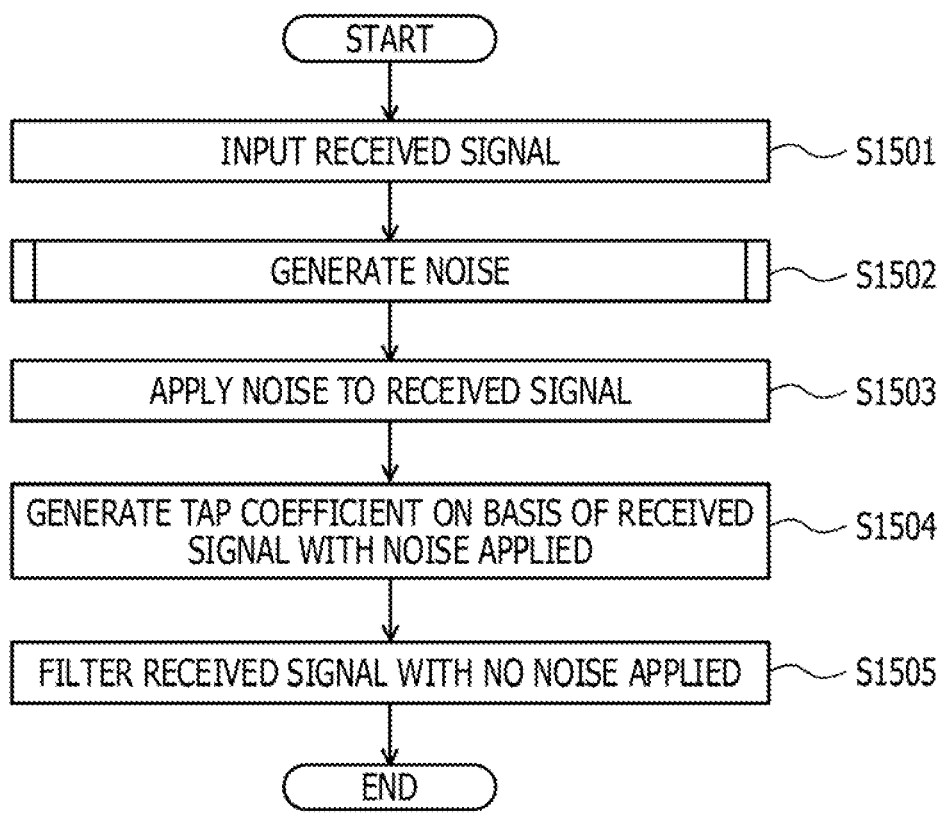
FIG. 15 is a flowchart illustrating an example of processing by the adaptive equalization circuit according to the embodiment.

FIG. 15 is a flowchart illustrating an example of processing by the adaptive equalization circuit according to the embodiment. The adaptive equalization circuit 100 illustrated in FIG. 6 performs, for example, processing illustrated in FIG. 15. First, received signals obtained by the coherent receiver front end 510 are input into the adaptive equalization circuit 100 (step S1501). For example, in the example illustrated in FIG. 5, the signals ($h_{in}$ and $V_{in}$) output from the phase shifter 530 are input as the received signals into the adaptive equalization circuit 100.

Next, the adaptive equalization circuit 100 uses the noise applying unit 130 to generate noise outside the bands of the received signals input in step S1501 (step S1502). The bands of the received signals are, for example, bands of signals transmitted from an optical transmitter facing the optical receiver 500, and are stored in, for example, a memory of the adaptive equalization circuit 100. Processing of generating noise in step S1502 will be described later (for example, refer to FIGS. 21 and 25).

Next, the adaptive equalization circuit 100 uses the noise applying unit 130 to apply the noise generated in step S1502 to received signals input in step S1501 (step S1503). Next, the adaptive equalization circuit 100 uses the filter coefficient update control unit 120 to generate a tap coefficient for the butterfly FIR filter 110 on the basis of the received signals to which the noise has been applied in step S1503 (step S1504).

Next, the adaptive equalization circuit 100 uses the butterfly FIR filter 110, for which the tap coefficient generated in step S1504 has been set, to filter received signals (step S1505), and a series of processing ends. The received signals to be filtered by the adaptive equalization circuit 100 in step S1505 are received signals that have been input in step S1501 and have not been applied with noise in step S1503.

The adaptive equalization circuit 100 outputs the signals obtained by the filtering in step S1505. For example, in the example illustrated in FIG. 5, the adaptive equalization circuit 100 outputs, to the demodulation/data recovery circuit 540, the signals obtained by the filtering as signals $H_{out}$ and $V_{out}$.

(Another Example of Filter Coefficient Update Control Unit According to Embodiment)

Figure 16:
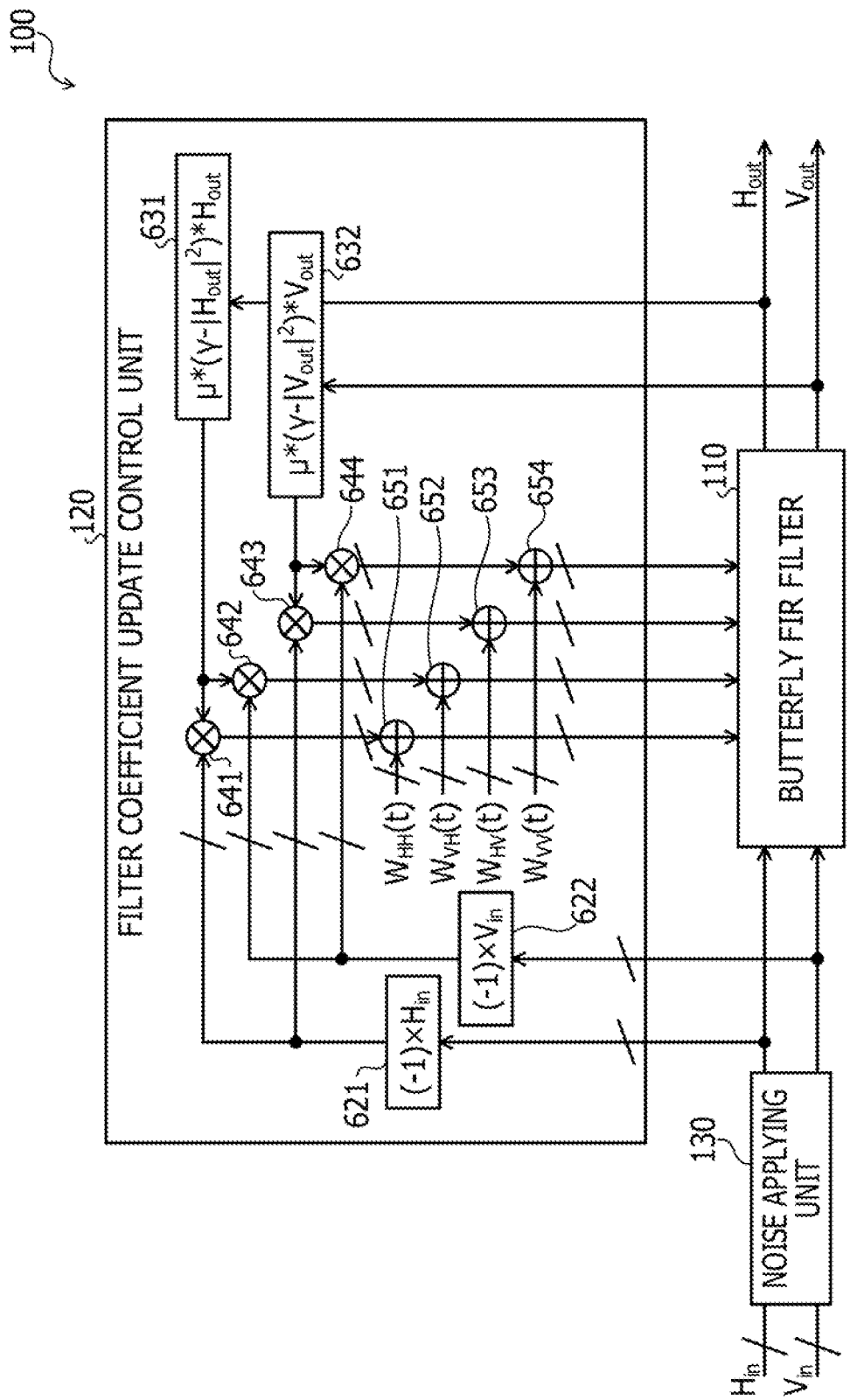
FIG. 16 is a diagram illustrating another example of the filter coefficient update control unit according to the embodiment.

FIG. 16 is a diagram illustrating another example of the filter coefficient update control unit according to the embodiment. In FIG. 16, portions that are similar to those illustrated in FIG. 6 are denoted by the same reference numerals, and descriptions thereof will be omitted. As illustrated in FIG. 16, the filter coefficient update control unit 120 may not include the butterfly FIR filter 610.

In this case, the butterfly FIR filter 110 performs filtering on the signals $H_{in}$ and $V_{in}$ to which noise has been applied by the noise applying unit 130. Consequently, the butterfly FIR filter 110 may output the same signals $H_{out}$ and $V_{out}$ as the butterfly FIR filter 610 illustrated in FIG. 6.

In this case, the filter coefficient update control unit 120 sets a tap coefficient for the butterfly FIR filter 110 on the basis of the signals $H_{in}$ and $V_{in}$ to which the noise has been applied by the noise applying unit 130 and the signals $H_{out}$ and $V_{out}$ processed by the butterfly FIR filter 110.

Thus, the filter coefficient update control unit 120 may not include the butterfly FIR filter 610. This allows for a reduction in circuit scale of the filter coefficient update control unit 120 and a reduction in processing amount of the filter coefficient update control unit 120.

Note that, in a configuration illustrated in FIG. 16, the filter coefficient update control unit 120 does not internally include the butterfly FIR filter 610. This creates a necessity for waiting for an output from the external butterfly FIR filter 110. Accordingly, the time for updating the tap coefficient becomes longer.

(Another Example of Processing by Adaptive Equalization Circuit According to Embodiment)

Figure 17:
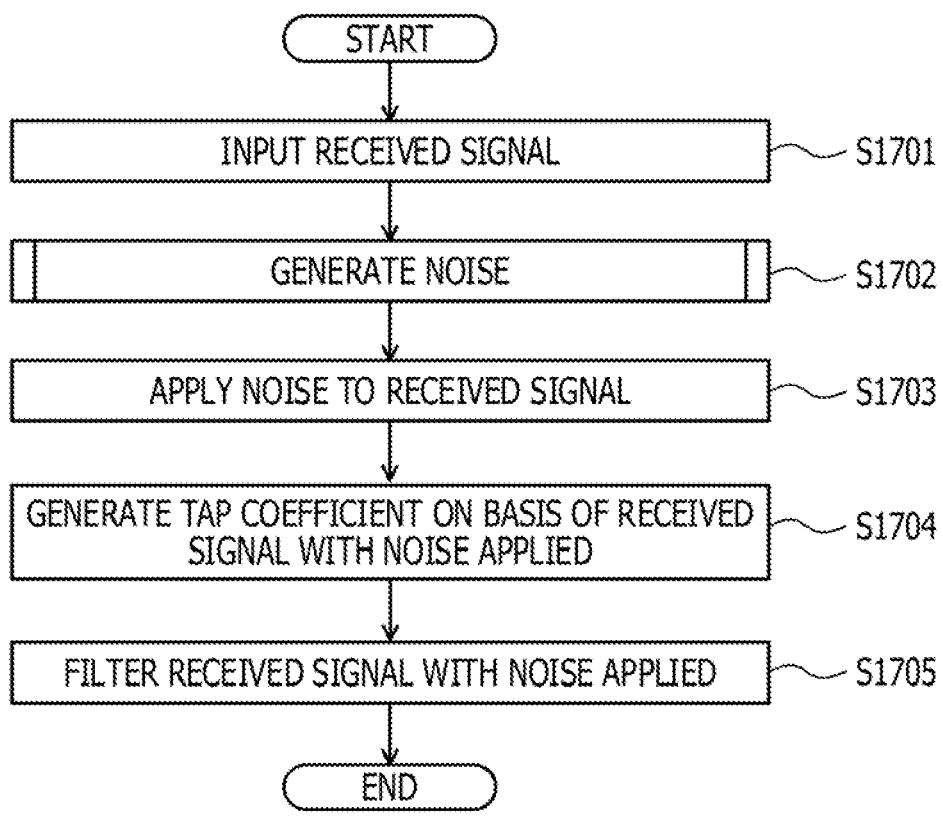
FIG. 17 is a flowchart illustrating another example of processing by the adaptive equalization circuit according to the embodiment.

FIG. 17 is a flowchart illustrating another example of processing by the adaptive equalization circuit according to the embodiment. The adaptive equalization circuit 100 illustrated in FIG. 16 performs, for example, processing illustrated in FIG. 17. Steps S1701 to S1705 illustrated in FIG. 17 are similar to steps S1501 to S1505 illustrated in FIG. 15. However, in step S1705, the adaptive equalization circuit 100 performs filtering by the butterfly FIR filter 110 on received signals to which noise has been applied in step S1703.

(Noise Applying Unit According to Embodiment)

Figure 18:
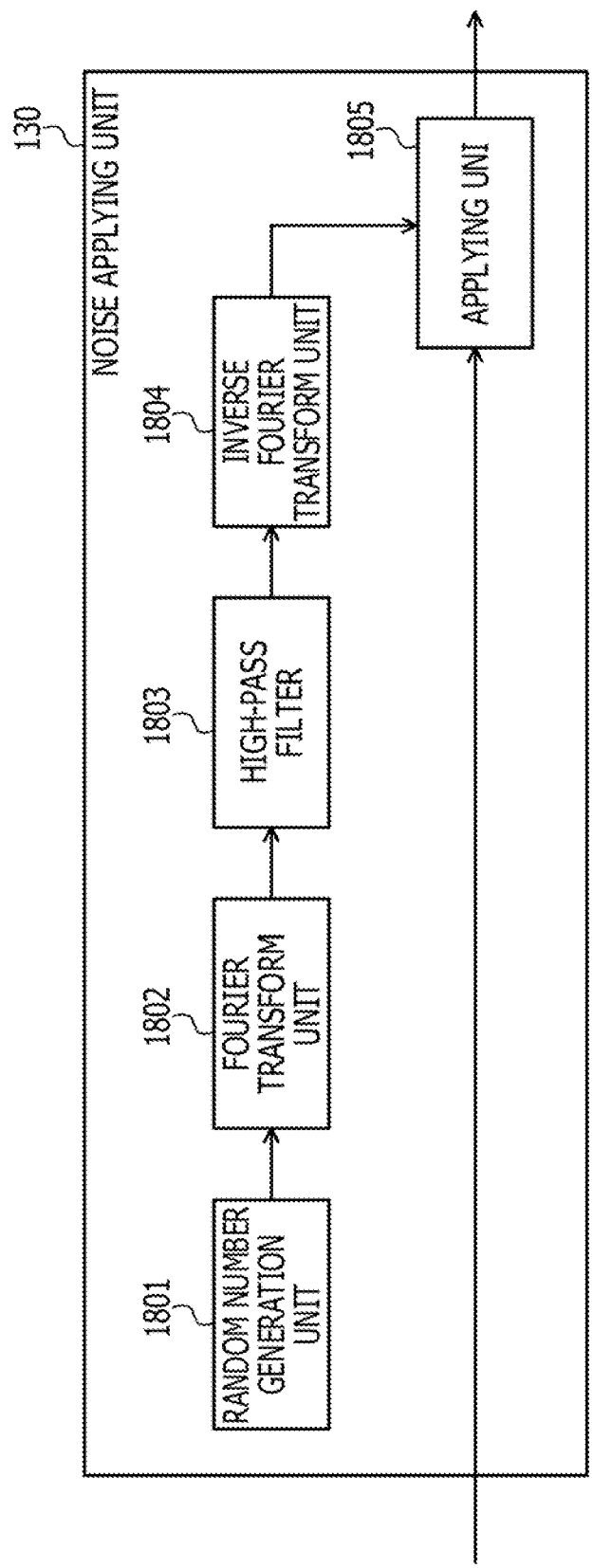
FIG. 18 is a diagram illustrating an example of a noise applying unit according to the embodiment.

FIG. 18 is a diagram illustrating an example of the noise applying unit according to the embodiment. As illustrated in FIG. 18, the noise applying unit 130 includes, for example, a random number generation unit 1801, a Fourier transform unit 1802, a high-pass filter 1803, an inverse Fourier transform unit 1804, and an applying unit 1805. The random number generation unit 1801 generates a random number sequence that randomly changes over time, and outputs the generated random number sequence as time-domain noise to the Fourier transform unit 1802.

The Fourier transform unit 1802 perform a Fourier transform to convert the time-domain noise output from the random number generation unit 1801 into frequency-domain noise. Then, the Fourier transform unit 1802 outputs the converted frequency-domain noise to the high-pass filter 1803.

The high-pass filter 1803 extracts only components having a frequency higher than the above-described signal band from the frequency-domain noise output from the Fourier transform unit 1802. For example, the high-pass filter 1803 performs Gaussian filter processing expressed by Equation (6) below. In Equation (6) below, cutoff indicates a cutoff frequency, and is an upper limit (e.g., 0.999) of the above-described signal band. amp indicates a predetermined noise amplitude (e.g., 1.0). n indicates a predetermined index (e.g., 1).

[Math. 6]

$$\text{amp} \cdot \exp\left[-\left\{\frac{freq-1}{2(1-\text{cutoff})}\right\}^{2n}\right] \quad (6)$$

The high-pass filter 1803 extracts only components having a frequency higher than the above-described signal band by, for example, substituting the frequency-domain noise output from the random number generation unit 1801 for freq in the Equation (6) described above. Then, the high-pass filter 1803 outputs the extracted components as frequency-domain noise to the inverse Fourier transform unit 1804.

The inverse Fourier transform unit 1804 performs an inverse Fourier transform to convert the frequency-domain noise output from the high-pass filter 1803 into time-domain noise. Then, the inverse Fourier transform unit 1804 outputs the converted time-domain noise to the applying unit 1805.

The applying unit 1805 applies the time-domain noise output from the inverse Fourier transform unit 1804 to the signals $H_{in}$ and $V_{in}$ input into the noise applying unit 130, and outputs the signals $H_{in}$ and $V_{in}$ with the noise applied.

(Time-Domain Noise Generated by Noise Applying Unit According to Embodiment)

Figure 19:
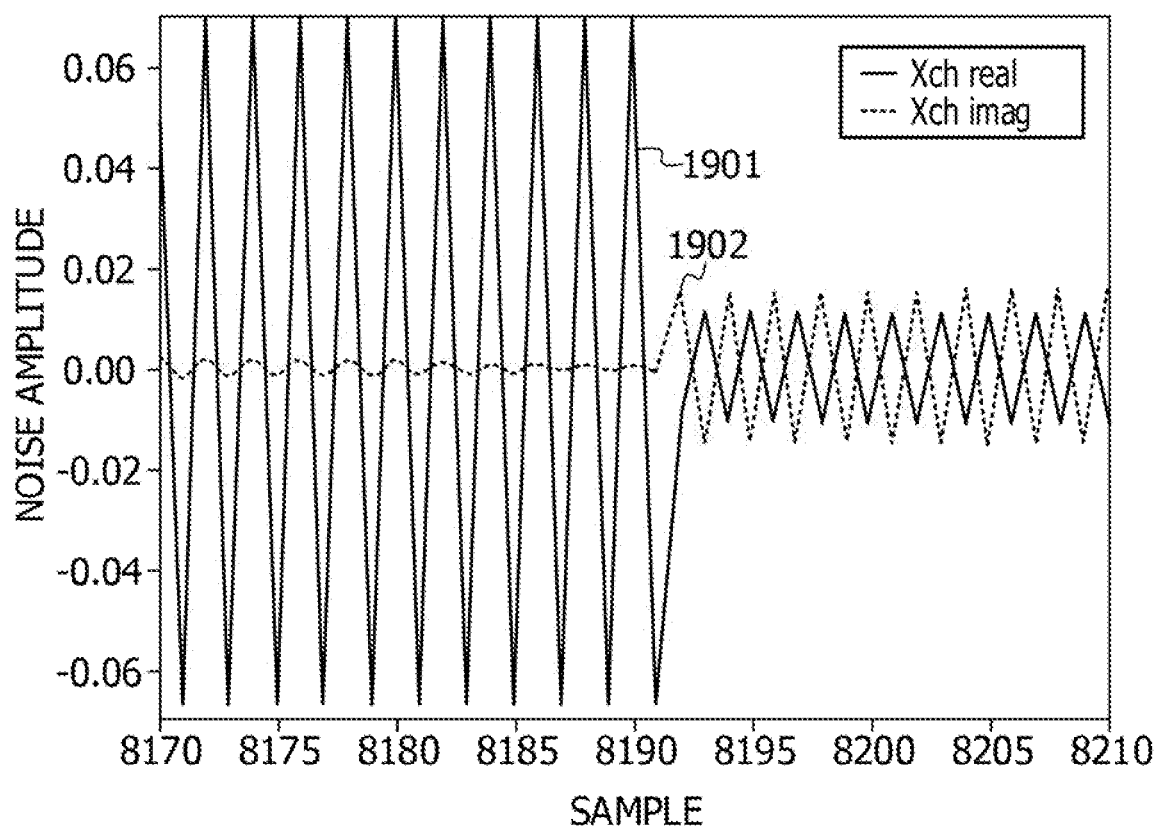
FIG. 19 is a graph illustrating an example of time-domain noise generated by the noise applying unit according to the embodiment.

FIG. 19 is a graph illustrating an example of time-domain noise generated by the noise applying unit according to the embodiment. In FIG. 19, a horizontal axis indicates the sample, and a vertical axis indicates the noise amplitude. H-polarization component noise to be applied to the signal will be described, and the same applies to V-polarization component noise to be applied to the signal $V_{in}$.

A noise waveform 1901 is a noise waveform of a real part (Xch real) of the H-polarization component. A noise waveform 1902 is a noise waveform of an imaginary part (Xch imag) of the H-polarization component. In the example illustrated in FIG. 19, the value of a random number generated by the random number generation unit 1801 changes at around sample=8190. In the applying unit 1805 illustrated in FIG. 18, each noise indicated by the noise waveforms 1901 and 1902 is applied to the signal $H_{in}$.

(Frequency-Domain Noise Generated by Noise Applying Unit According to Embodiment)

Figure 20:
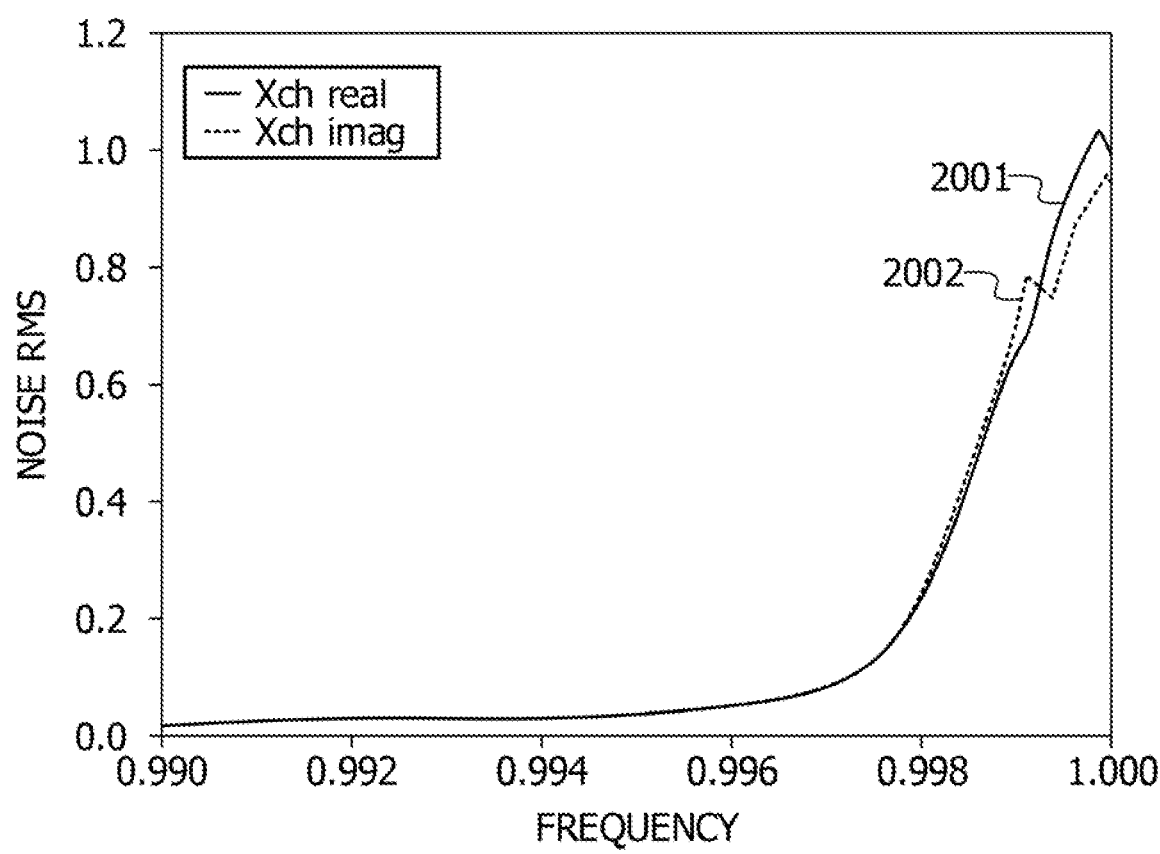
FIG. 20 is a graph illustrating an example of frequency-domain noise generated by the noise applying unit according to the embodiment.

FIG. 20 is a graph illustrating an example of frequency-domain noise generated by the noise applying unit according to the embodiment. In FIG. 20, a horizontal axis indicates the frequency, and ½ of a sampling frequency is indicated as 1.0. A vertical axis indicates a noise root mean square (RMS). H-polarization component noise to be applied to the signal $H_{in}$ will be described, and the same applies to V-polarization component noise to be applied to the signal $V_{in}$.

A spectrum 2001 is a noise spectrum of a real part (Xch real) of the H-polarization component. In other words, the spectrum 2001 indicates a state of the noise waveform 1901 illustrated in FIG. 19 before the inverse Fourier transform by the inverse Fourier transform unit 1804. The noise waveform 1902 is a noise waveform of an imaginary part (Xch imag) of the H-polarization component. In other words, a spectrum 2002 indicates a state of the noise waveform 1902 illustrated in FIG. 19 before the inverse Fourier transform by the inverse Fourier transform unit 1804.

As indicated by the spectra 2001 and 2002 in FIG. 20, the noise applying unit 130 generates noise outside the signal band from which frequency components equal to or less than 0.999, which is the upper limit of the signal band, have been removed (attenuated).

(Processing by Noise Applying Unit According to Embodiment)

Figure 21:
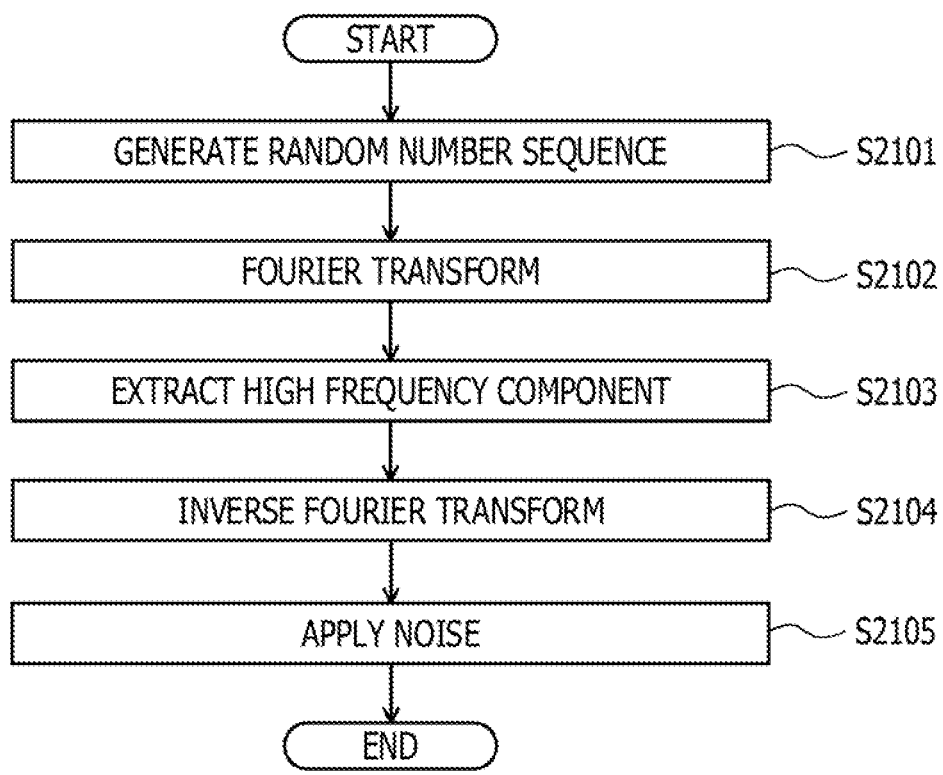
FIG. 21 is a flowchart illustrating an example of processing by the noise applying unit according to the embodiment.

FIG. 21 is a flowchart illustrating an example of processing by the noise applying unit according to the embodiment. The noise applying unit 130 illustrated in FIG. 18 performs, for example, processing illustrated in FIG. 21. First, the noise applying unit 130 uses the random number generation unit 1801 to generate a random number sequence (step S2101), Consequently, time-domain noise may be generated.

Next, the noise applying unit 130 uses the Fourier transform unit 1802 to perform a Fourier transform on the random number sequence generated in step S2101 (step S2102). Consequently, frequency-domain noise may be generated. Next, the noise applying unit 130 uses the high-pass filter 1803 to extract a high frequency component from the frequency-domain noise generated in step S2102 (step S2103). Consequently, frequency-domain noise outside the signal band may be generated.

Next, the noise applying unit 130 uses the inverse Fourier transform unit 1804 to perform an inverse Fourier transform on the frequency-domain noise generated in step S2103 (step S2104). Consequently, time-domain noise outside the signal band may be generated. Next, the noise applying unit 130 outputs the signals $H_{in}$ and $V_{in}$, to which the applying unit 1805 has applied the time-domain noise outside the signal band generated in step S2104 (step S2105), and a series of processing ends.

Note that the noise applying unit 130 may generate noise for each of the signals $H_{in}$ and $V_{in}$. For example, the noise applying unit 130 may perform steps S2101 to S2104 for each of the signals $H_{in}$ and $V_{in}$ to generate noises, and apply the generated noises to the corresponding signals $H_{in}$ and $V_{in}$ in step S2105.

As illustrated in FIGS. 18 to 21, the noise applying unit 130 may generate noise outside the signal band by, for example, extracting noise outside the band from frequency-domain noise obtained by performing a Fourier transform on a random number sequence, and performing an inverse Fourier transform on the extracted noise.

(Another Example of Noise Applying Unit According to Embodiment)

Figure 22:
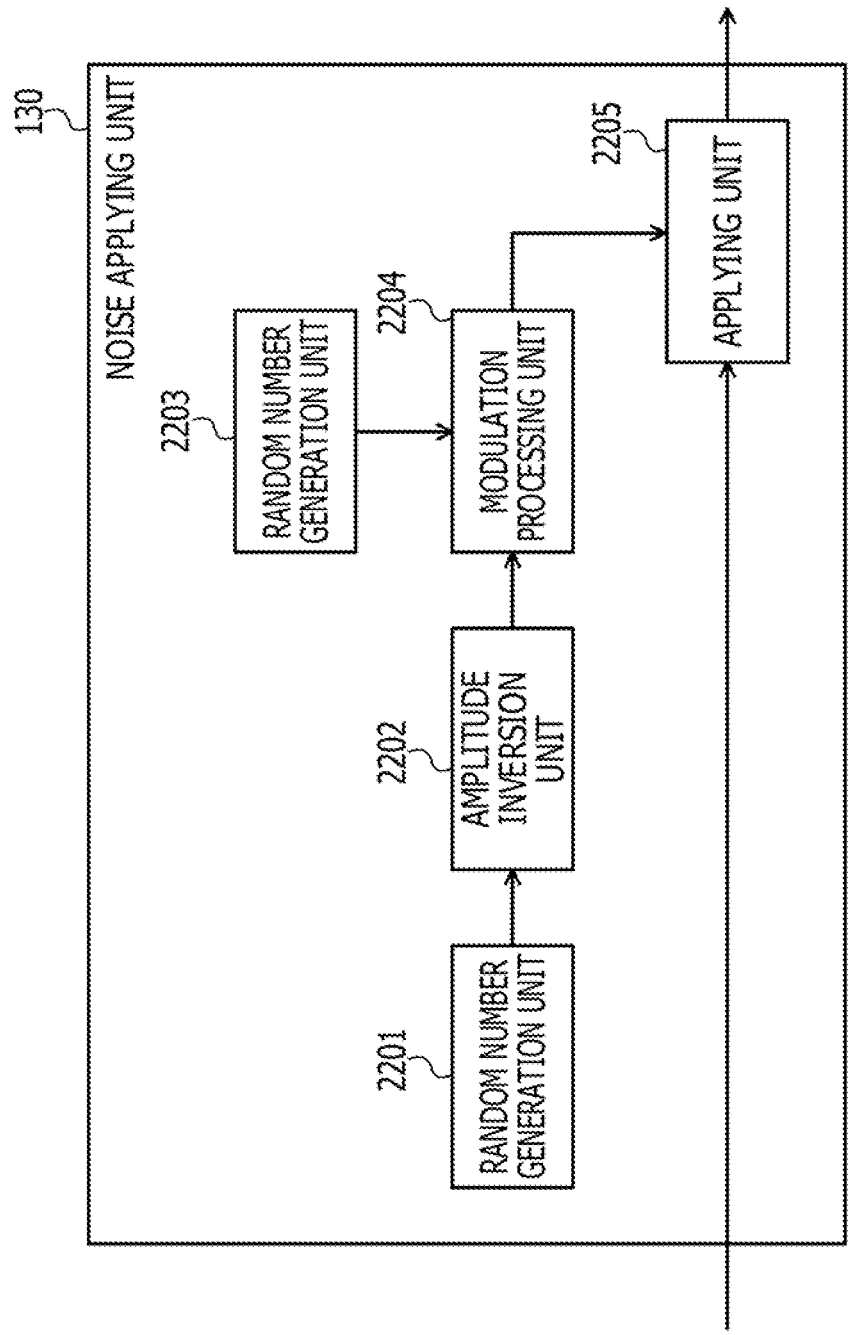
FIG. 22 is a diagram illustrating another example of the noise applying unit according to the embodiment.

FIG. 22 is a diagram illustrating another example of the noise applying unit according to the embodiment. In the description with reference to FIG. 18, the noise applying unit 130 is configured to generate noise outside the signal band in the frequency domain. Alternatively, the noise applying unit 130 may be configured to generate noise outside the signal band in the time domain.

For example, the noise applying unit 130 may include, as illustrated in FIG. 22, a random number generation unit 2201, an amplitude inversion unit 2202, a random number generation unit 2203, a modulation processing unit 2204, and an applying unit 2205. The random number generation unit 2201 generates a random number and outputs the generated random number to the amplitude inversion unit 2202.

The amplitude inversion unit 2202 inverts the positive/negative of the random number output from the random number generation unit 2201 for each sample (for each sampling period). Then, the amplitude inversion unit 2202 outputs the positive/negative-inverted random number to the modulation processing unit 2204. The random number generation unit 2203 generates a random number and outputs the generated random number to the modulation processing unit 2204.

The modulation processing unit 2204 modulates the random number output from the amplitude inversion unit 2202 every q samples (e.g., 1024 sampling periods), and outputs the modulated random number, as noise, to the applying unit 2205. The modulation by the modulation processing unit 2204 is, for example, at least one of phase modulation or amplitude modulation. In a case where the modulation processing unit 2204 performs phase modulation and amplitude modulation, the modulation processing unit 2204 may phase-modulate and then amplitude-modulate the random number, or may amplitude-modulate and then phase-modulate the random number. Furthermore, the modulation processing unit 2204 changes a modulation state of the random number output from the amplitude inversion unit 2202 on the basis of the random number output from the random number generation unit 2203.

The applying unit 2205 applies noise output from the modulation processing unit 2204 to the signals $H_{in}$ and $V_{in}$ input into the noise applying unit 130, and outputs the signals $H_{in}$ and $V_{in}$ with the noise applied, to the filter coefficient update control unit 120. In the noise applying unit 130 illustrated in FIG. 22, since a Fourier transform and an inverse Fourier transform do not have to be performed, the circuit scale of the noise applying unit 130 may be reduced, and a processing amount of the noise applying unit 130 may be reduced.

(Another Example of Time-Domain Noise Generated by Noise Applying Unit According to Embodiment)

Figure 23:
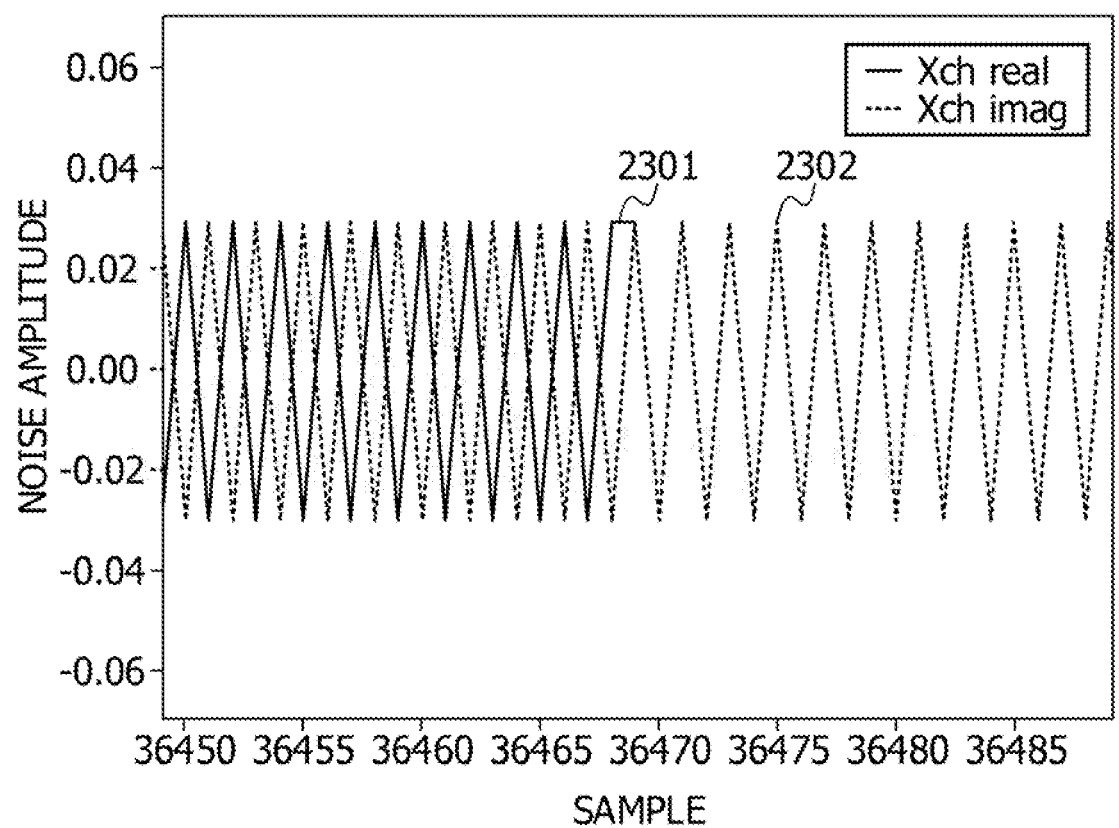
FIG. 23 is a graph illustrating another example of time-domain noise generated by the noise applying unit according to the embodiment.

FIG. 23 is a graph illustrating another example of time-domain noise generated by the noise applying unit according to the embodiment. In FIG. 23, a horizontal axis indicates the sample, and a vertical axis indicates the noise amplitude. H-polarization component noise to be applied to the signal $H_{in}$ will be described, and the same applies to V-polarization component noise to be applied to the signal $V_{in}$. In the example illustrated in FIG. 23, the modulation processing unit 2204 illustrated in FIG. 22 performs noise phase modulation.

A noise waveform 2301 is a noise waveform of a real part (Xch real) of the H-polarization component. A noise waveform 2302 is a noise waveform of an imaginary part (Xch imag) of the H-polarization component. In the example illustrated in FIG. 23, the value of a random number generated by the random number generation unit 2203 changes at around sample=35467. In the applying unit 2205 illustrated in FIG. 22, each noise indicated by the noise waveforms 2301 and 2302 is applied to the signal $H_{in}$.

(Another Example of Frequency-Domain Noise Generated by Noise Applying Unit According to Embodiment)

Figure 24:
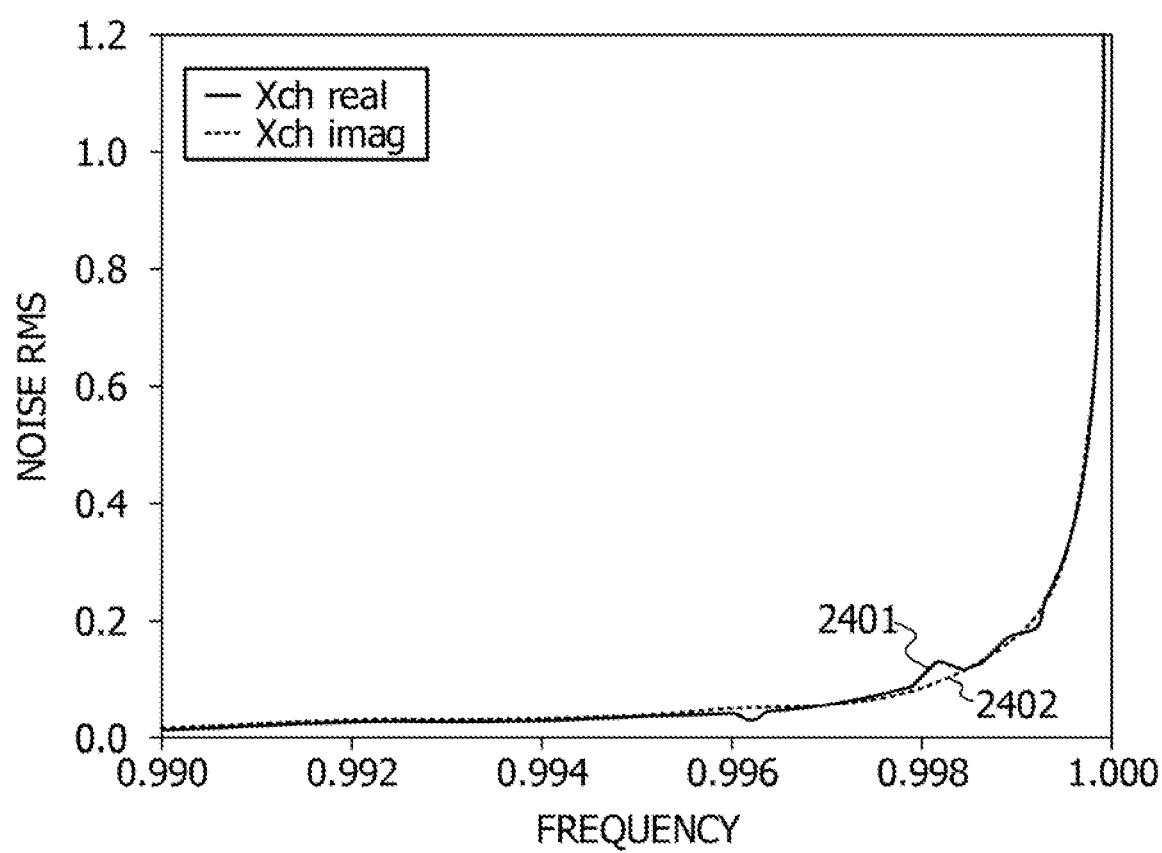
FIG. 24 is a graph illustrating another example of frequency-domain noise generated by the noise applying unit according to the embodiment.

FIG. 24 is a graph illustrating another example of frequency-domain noise generated by the noise applying unit according to the embodiment. In FIG. 24, a horizontal axis indicates the frequency, and ½ of a sampling frequency is indicated as 1.0. A vertical axis indicates the noise RMS. H-polarization component noise to be applied to the signal $H_{in}$ will be described, and the same applies to V-polarization component noise to be applied to the signal $V_{in}$.

A spectrum 2401 is a noise spectrum of a real part (Xch real) of the H-polarization component. A spectrum 2402 is a noise waveform of an imaginary part (Xch imag) of the H-polarization component. As indicated by the spectra 2401 and 2402 in FIG. 24, the noise applying unit 130 generates noise outside the signal band from which frequency components equal to or less than 0.999, which is the upper limit of the signal band, have been removed (attenuated).

Note that the spectrum of noise output from the amplitude inversion unit 2202 to the modulation processing unit 2204 shows a peak only at frequency=1.000 in FIG. 24. By phase-modulating this noise by the modulation processing unit 2204, it is possible to broaden the noise spectrum as indicated by the spectra 2401 and 2402, and generate noise outside the signal band.

(Another Example of Processing by Noise Applying Unit According to Embodiment)

Figure 25:
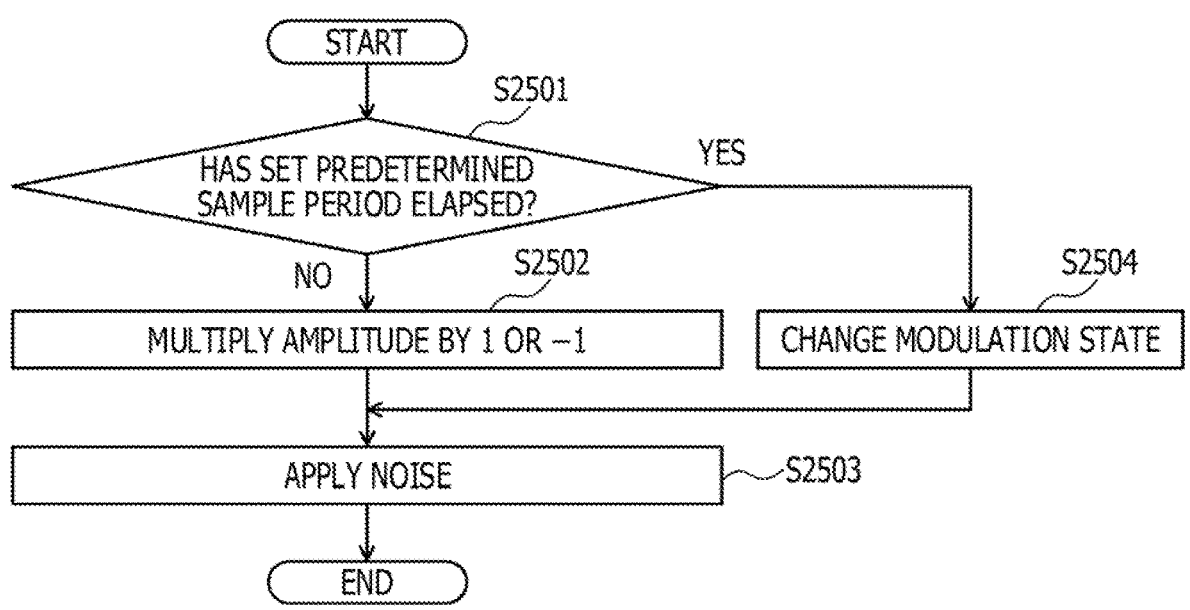
FIG. 25 is a flowchart illustrating another example of processing by the noise applying unit according to the embodiment.

FIG. 25 is a flowchart illustrating another example of processing by the noise applying unit according to the embodiment. The noise applying unit 130 illustrated in FIG. 22 performs, for example, processing illustrated in FIG. 25. The processing illustrated in FIG. 25 is performed for each sampling period, for example. First, the noise applying unit 130 determines whether a predetermined sample period set in advance has elapsed (step S2501). The predetermined sample period is, for example, a period corresponding to the above-described q samples.

In step S2501, if the predetermined sample period has not elapsed (step S2501: No), the noise applying unit 130 proceeds to step S2502. In other words, the noise applying unit 130 uses the amplitude inversion unit 2202 to multiply the amplitude of noise generated by the random number generation unit 2201 by 1 or 1 (step S2502). In step S2502, the noise applying unit 130 switches between 1 and 1 to use for the multiplication for each sampling period, that is, every time step S2502 is performed. Thus, the positive/negative of the amplitude of the noise may be inverted for each sample.

Next, the noise applying unit 130 outputs the signals $H_{in}$ and $V_{in}$ to which the applying unit 2205 has applied the noise modulated by the modulation processing unit 2204 (step S2503), and a series of processing for the sampling period ends.

In step S2501, if the predetermined sample period has elapsed (step S2501: Yes), the noise applying unit 130 proceeds to step S2504. In other words, the noise applying unit 130 changes a noise modulation state in the modulation processing unit 2204 by changing the value of a random number generated by the random number generation unit 2203 (step S2504), and proceeds to step S2503.

Note that the noise applying unit 130 may generate noise for each of the signals $H_{in}$ and $V_{in}$. For example, the noise applying unit 130 may perform steps S2501, S2502, and S2504 for each of the signals $H_{in}$ and $V_{in}$ to generate noises, and apply the generated noises to the corresponding signals $H_{in}$ and $V_{in}$ in step S2503.

In step S2504, for example, in a case where the modulation processing unit 2204 performs phase modulation, the noise applying unit 130 randomly changes the amount of noise phase shift by the modulation processing unit 2204. Furthermore, in a case where the modulation processing unit 2204 performs amplitude modulation, the noise applying unit 130 randomly changes the amount of noise amplitude amplification by the modulation processing unit 2204. Furthermore, in a case where the modulation processing unit 2204 performs phase modulation and amplitude modulation, the noise applying unit 130 randomly changes the amount of noise phase shift by the modulation processing unit 2204 and the amount of noise amplitude amplification by the modulation processing unit 2204.

As illustrated in FIGS. 22 to 25, the noise applying unit 130 may invert the positive/negative of the amplitude of the generated noise for each sample of the signal to be processed by the adaptive equalization circuit 100, and modulate, for each plurality of samples of the signal, the noise with the positive/negative of the amplitude inverted. Thus, noise outside the signal band may be generated. Furthermore, in this case, since a Fourier transform and an inverse Fourier transform do not have to be performed, the circuit scale of the noise applying unit 130 may be reduced and the processing amount of the noise applying unit 130 may be reduced.

(Still Another Example of Noise Applying Unit According to Embodiment)

Figure 26:
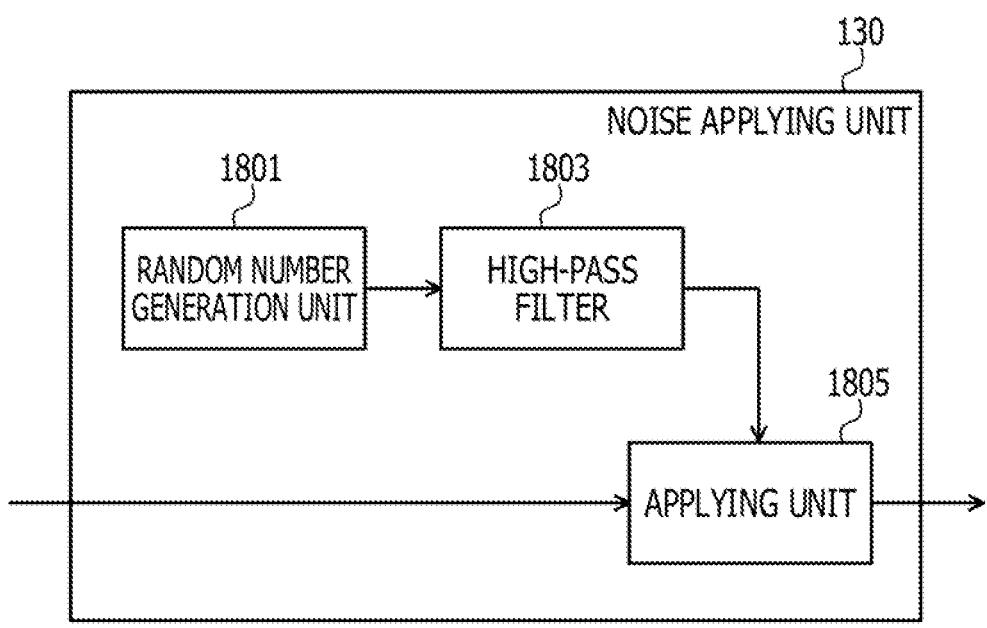
FIG. 26 is a diagram illustrating still another example of the noise applying unit according to the embodiment.

FIG. 26 is a diagram illustrating still another example of the noise applying unit according to the embodiment. In FIG. 26, portions that are similar to those illustrated in FIG. 18 are denoted by the same reference numerals, and descriptions thereof will be omitted. The noise applying unit 130 may include, for example, the random number generation unit 1801, the high-pass filter 1803, and the applying unit 1805 as illustrated in FIG. 26. In other words, the noise applying unit 130 may have a configuration in which the Fourier transform unit 1802 and the inverse Fourier transform unit 1804 are omitted from the configuration illustrated in FIG. 18.

In this case, the random number generation unit 1801 outputs a generated random number sequence, as noise, to the high-pass filter 1803. The high-pass filter 1803 extracts only components having a frequency higher than the above-described signal band from the noise output from the random number generation unit 1801, For example, the high-pass filter 1803 may be various filters such as an FIR filter and an infinite impulse response (IIR) filter. The high-pass filter 1803 outputs the extracted components, as noise, to the applying unit 1805.

The applying unit 1805 applies the noise output from the high-pass filter 1803 to the signals $H_{in}$ and $V_{in}$ input into the noise applying unit 130, and outputs the signals $H_{in}$ and $V_{in}$ with the noise applied.

(Still Another Example of Processing by Noise Applying Unit According to Embodiment)

Figure 27:
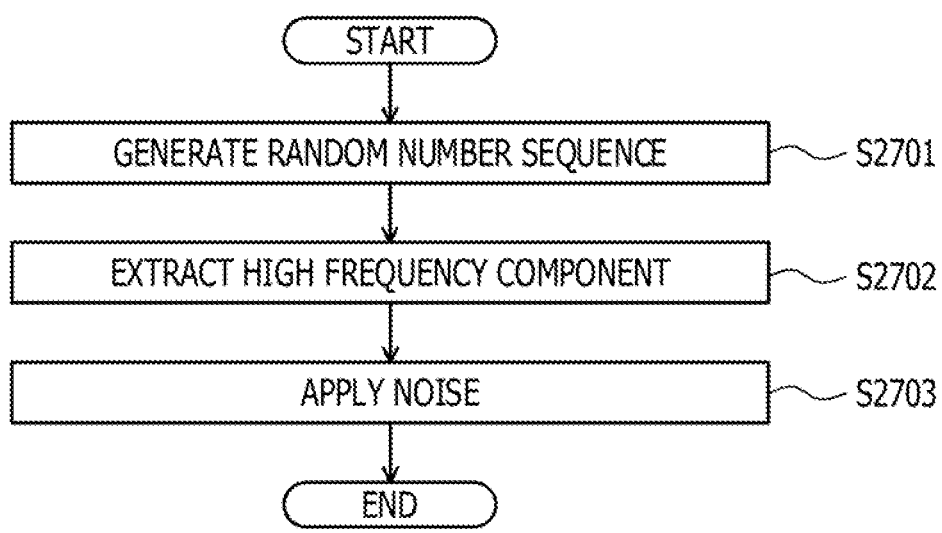
FIG. 27 is a flowchart illustrating still another example of processing by the noise applying unit according to the embodiment.

FIG. 27 is a flowchart illustrating still another example of processing by the noise applying unit according to the embodiment. The noise applying unit 130 illustrated in FIG. 26 performs, for example, processing illustrated in FIG. 27. First, the noise applying unit 130 uses the random number generation unit 1801 to generate a random number sequence (step S2701). Consequently, time-domain noise may be generated.

Next, the noise applying unit 130 uses the high-pass filter 1803 to extract a high frequency component from the noise generated in step S2701 (step S2702). Consequently, frequency-domain noise outside the signal band may be generated.

Next, the noise applying unit 130 outputs the signals $H_{in}$ and $V_{in}$, to which the applying unit 1805 has applied the frequency-domain noise generated in step S2702 (step S2703), and a series of processing ends.

Note that the noise applying unit 130 may generate noise for each of the signals $H_{in}$ and $V_{in}$. For example, the noise applying unit 130 may perform steps S2701 and S2702 for each of the signals $H_{in}$ and $V_{in}$ to generate noises, and apply the generated noises to the corresponding signals $H_{in}$ and $V_{in}$ in step S2703.

As illustrated in FIGS. 26 and 27, the noise applying unit 130 may generate noise outside the signal band by passing a random number sequence through a high-pass filter, for example.

Thus, the adaptive equalization circuit 100 according to the embodiment may attenuate the tap coefficient outside the signal band by setting a tap coefficient for the filter on the basis of the input signal to which noise outside the signal band has been applied. Consequently, the tap coefficient may converge within the number of taps and the accuracy of compensation for transmission line characteristics may be improved.

As described above, the adaptive equalization circuit and the optical receiver allow the tap coefficient to converge within the number of taps and the accuracy of compensation for transmission line characteristics to be improved.

For example, digital coherent receivers have conventionally been expected to achieve a reduction in power consumption and circuit scale in digital signal processing, for power saving and miniaturization of apparatuses. As a method for reducing the power consumption and circuit scale, there is a method of reducing the number of taps in the adaptive equalization circuit. For example, the number of taps may be reduced by using the above-described fractional adaptive equalization.

However, the fractional adaptive equalization has a problem in that, as described above, the tap coefficient does not converge within the number of taps and the accuracy of compensation for transmission line characteristics decreases. On the other hand, according to the above-described embodiment, by generating a tap coefficient of the adaptive equalization circuit by using an input signal to which noise outside the band has been applied, a tap coefficient attenuated outside the band may be generated. This allows the tap coefficient to converge within the number of taps and the accuracy of compensation for transmission line characteristics to be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An adaptive equalization circuit comprising:
    a first filter configured to perform filtering on an input signal based on a tap coefficient;
    an applying circuit configured to apply, to the signal, noise outside a band of the signal; and
    a controller configured to set, for the first filter, the tap coefficient that compensates for transmission line characteristics of the signal, based on the signal to which the noise is applied by the applying circuit,
    the controller includes a second filter configured to perform the same filtering as the first filter on the signal to which the noise is applied by the applying circuit, and is configured to set the tap coefficient for the first filter based on the signal to which the noise is applied by the applying circuit and the signal on which the filtering is performed by the second filter, and
    the first filter is configured to perform the filtering on the signal to which the noise is not applied by the applying circuit.

2. An adaptive equalization circuit comprising:
    a first filter configure to receive an input signal and perform filtering on the input signal based on a tap coefficient;

an applying circuit configured to receive the input signal in parallel with the first filter and apply, to the input signal, noise outside a band of the input signal; and a controller configured to receive the input signal to which the noise is applied from the applying circuit and set, for the first filter, the tap coefficient that compensates for transmission line characteristics of the input signal which is received in parallel with the applying circuit by the first filter, based on the input signal to which the noise is applied by the applying circuit, the controller is configured to set the tap coefficient for the filter based on the signal to which the noise is applied by the applying circuit and the signal on which the filtering is performed by the first filter, and the first filter is configured to perform the filtering on the signal to which the noise is applied by the applying circuit.

3. The adaptive equalization circuit according to claim 1, wherein the first filter is a finite impulse response (FIR) filter.

4. The adaptive equalization circuit according to claim 1, wherein the input signal is a digital signal which is obtained by sampling a signal obtained by photoelectrically converting signal light, at a frequency that is a non-integer multiple of a sampling frequency of the signal light.

5. The adaptive equalization circuit according to claim 1, wherein the controller is configured to set the tap coefficient for the filter based on the signal to which the noise is applied by the applying circuit and the signal on which the filtering is performed by the first filter, and the first filter is configured to perform the filtering on the signal to which the noise is applied by the applying circuit.

6. The adaptive equalization circuit according to claim 1, wherein the applying circuit is configured to extract noise outside the band from noise obtained by performing a Fourier transform on a random number sequence, and apply, to the signal, noise obtained by performing an inverse Fourier transform on the extracted noise.

7. The adaptive equalization circuit according to claim 1, wherein the applying circuit is configured to apply, to the signal, noise obtained by inverting positive and negative of amplitude of generated noise for each sample of the signal, and modulating, for each plurality of samples of the signal, the noise with the positive and negative of the amplitude inverted.

8. The adaptive equalization circuit according to claim 1, wherein the applying circuit is configured to apply, to the signal, noise obtained by passing a random number sequence through a high-pass filter.

9. An optical receiver comprising:

a first filter configured to receive a digital signal obtained by sampling a signal obtained by photoelectrically converting signal light, at a frequency that is a non-integer multiple of a sampling frequency of the signal light and perform, based on a tap coefficient, filtering on the digital signal;

an applying circuit configured to receive the digital signal in parallel with the filter apply, to the digital signal, noise outside a band of the digital signal; and a controller configured to receive the digital signal to which the noise is applied from the applying circuit and set, for the filter, the tap coefficient that compensates for transmission line characteristics of the digital signal which is received in parallel with the applying circuit by the filter, based on the digital signal to which the noise is applied by the applying circuit, the controller includes a second filter configured to perform the same filtering as the first filter on the signal to which the noise is applied by the applying circuit, and is configured to set the tap coefficient for the first filter based on the signal to which the noise is applied by the applying circuit and the signal on which the filtering is performed by the second filter, and the first filter is configured to perform the filtering on the signal to which the noise is not applied by the applying circuit.

* * * * *